United States Patent
Hofmann et al.

(10) Patent No.: US 10,140,513 B2
(45) Date of Patent: Nov. 27, 2018

(54) REFERENCE IMAGE SLICING

(71) Applicant: Layar B.V., Amsterdam (NL)

(72) Inventors: Klaus Michael Hofmann, Amsterdam (NL); Dirk Groten, Amsterdam (NL); Raimo Juhani Van Der Klein, Hoofddorp (NL)

(73) Assignee: LAYAR B.V., Amsterdam (NL)

( * ) Notice: Subject to any disclaimer, the term of this patent is extended or adjusted under 35 U.S.C. 154(b) by 469 days.

(21) Appl. No.: 14/397,296

(22) PCT Filed: Apr. 25, 2013

(86) PCT No.: PCT/EP2013/058634
§ 371 (c)(1),
(2) Date: Oct. 27, 2014

(87) PCT Pub. No.: WO2013/160404
PCT Pub. Date: Oct. 31, 2013

(65) Prior Publication Data
US 2015/0116355 A1    Apr. 30, 2015

(30) Foreign Application Priority Data
Apr. 27, 2012  (EP) .................................. 12166076

(51) Int. Cl.
*G06T 19/00* (2011.01)
*G06K 9/00* (2006.01)
(Continued)

(52) U.S. Cl.
CPC .......... *G06K 9/00671* (2013.01); *G06K 9/46* (2013.01); *G06K 9/4676* (2013.01); *G06T 7/74* (2017.01);
(Continued)

(58) Field of Classification Search
CPC .................................................... G06T 19/006
See application file for complete search history.

(56) References Cited

U.S. PATENT DOCUMENTS

| | | | | |
|---|---|---|---|---|
| 8,270,671 B1* | 9/2012 | Medasani | .......... | G06K 9/00986 382/103 |
| 2006/0050152 A1* | 3/2006 | Rai | .................... | H04N 5/23238 348/218.1 |

(Continued)

OTHER PUBLICATIONS

Maturana et al., "Face Recognition with Local Binary Patterns, Spatial Pyramid Histograms and Naive Bayes Nearest Neighbor Classification", Chilean Computer Science Society (SCCC), 2009 International Conference of the, IEEE, Piscataway, NJ, USA, Nov. 10, 2009, pp. 125-132, XP031720353.

(Continued)

*Primary Examiner* — Phi Hoang
(74) *Attorney, Agent, or Firm* — Steven M. Koehler; Westman, Champlin & Koehler, P.A.

(57) ABSTRACT

Method and systems for generating reference features sets for slices of a reference image. The reference features sets generated from slices enables better object recognition and/or tracking when a camera image only shows a portion of the reference image. Metadata is used to link the reference features set of the original image and of the slices together as belonging to the same object, providing hierarchical relationship information and/or spatial relationship information. An image processing function may be dynamically configured on the basis of whether an object has been successfully detected and the metadata associated with the object.

21 Claims, 12 Drawing Sheets

(51) Int. Cl.
*G06K 9/46* (2006.01)
*G06T 7/73* (2017.01)
*G06K 9/32* (2006.01)

(52) U.S. Cl.
CPC .... *G06T 19/006* (2013.01); *G06K 2009/3291* (2013.01); *G06T 2207/10004* (2013.01); *G06T 2207/20104* (2013.01)

(56) References Cited

U.S. PATENT DOCUMENTS

| | | | | |
|---|---|---|---|---|
| 2007/0196007 | A1* | 8/2007 | Chen | A61B 6/00 382/131 |
| 2012/0069203 | A1* | 3/2012 | Voss | H04N 5/144 348/208.1 |
| 2013/0084012 | A1* | 4/2013 | Murphy | G06K 9/00671 382/190 |
| 2014/0063055 | A1* | 3/2014 | Osterhout | G06F 3/005 345/633 |

OTHER PUBLICATIONS

Ta et al., "SURFTrac: Efficient Tracking and Continuous Object Recognition Using Local Feature Descriptors", IEEE Computer Society Conference on Computer Vision and Pattern Recognition, Jun. 20, 2009, XP002690398.

Adam et al., "Robust Fragments-based Tracking Using the Integral Histogram", Conference on Computer Vision and Pattern Recognition, 2006 IEEE Computer Society, New York, NY, USA Jun. 17-22, 2006, IEEE, Piscataway, NJ, USA, vol. 1, Jun. 17, 2006, pp. 798-805, XP010923040.

Wagner et al., "Multiple Target Detection and Tracking with Guaranteed Framerates on Mobile Phones", Mixed and Augmented Reality, 2009. ISMAR 2009. 8th IEEE International Symposium on, IEEE, Piscataway, NJ, USA, Oct. 19, 2009, pp. 57-64, XP031568944.

International Search Report and Written Opinion dated Jun. 5, 2013 for corresponding International Application No. PCT/EP2013/058634, filed Apr. 25, 2013.

\* cited by examiner

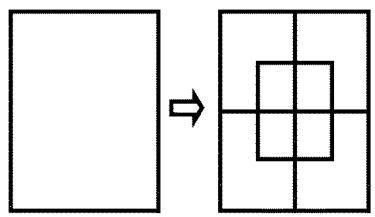 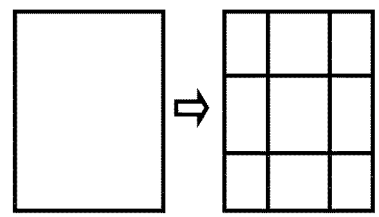
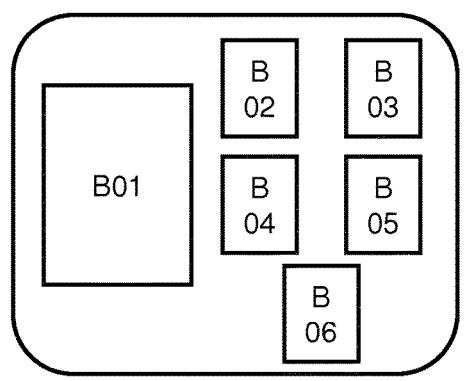 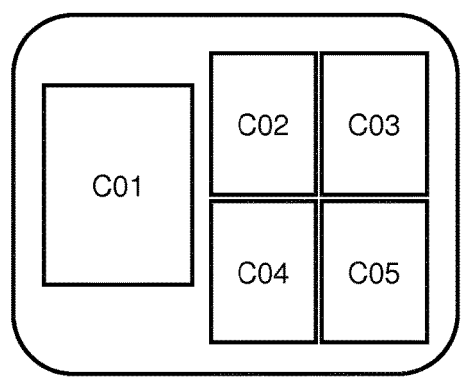
FIG. 3A  FIG. 3B
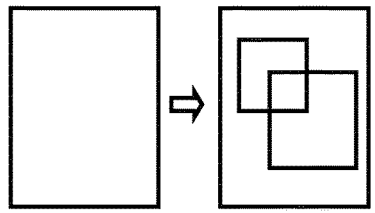 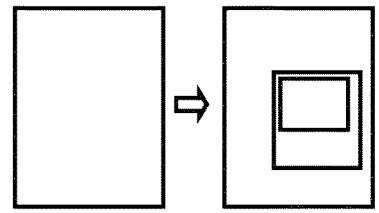
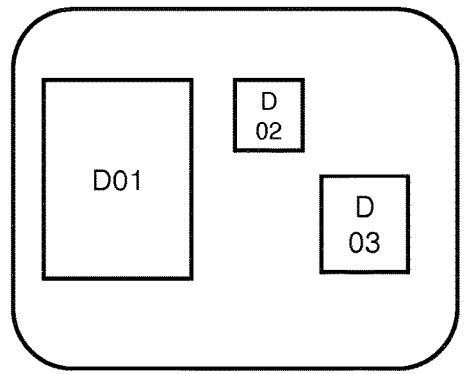 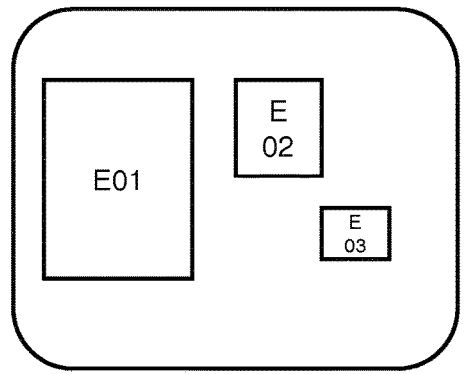
FIG. 3C  FIG. 3D

PAGE A
ID                      A
IDs IN GROUP:           A01, A02, A03, A04, A05

ORIGINAL REFERENCE IMAGE
Page ID         A
ID:             A01
Parent ID:      -
Children IDs:   A02, A03, A04, A05
Size:           (100,100)
Anchor:         (0,0)
Offset:         (0,0)

SLICE 02
Page ID         A
ID:             A02
Parent ID:      A01
Children IDs:   -
Size:           (50,50)
Anchor:         (0,0)
Offset:         (0,0)

SLICE 03
Page ID         A
ID:             A03
Parent ID:      A01
Children IDs:   -
Size:           (50,50)
Anchor:         (0,0)
Offset:         (50,0)

SLICE 05
Page ID         A
ID:             A05
Parent ID:      A01
Children IDs:   -
Size:           (50,50)
Anchor:         (0,0)
Offset:         (0,50)

SLICE 05
Page ID         A
ID:             A05
Parent ID:      A01
Children IDs:   -
Size:           (50,50)
Anchor:         (0,0)
Offset:         (50,50)

REFERENCE IMAGE SLICING

CROSS-REFERENCE TO RELATED APPLICATION

The present application is a Section 371 national stage filing of International patent application Serial No. PCT/EP2013/058634, filed Apr. 25, 2013, and published as WO 2013/160404 A1 in English.

BACKGROUND

The discussion below is merely provided for general background information and is not intended to be used as an aid in determining the scope of the claimed subject matter.

Aspects of the disclosure generally relates to processing of a reference image and dynamically configuring an image processing function. In particular, though not exclusively, the disclosure relates to methods and systems for slicing a reference image and/or configuring an image processing function to process the slices of the reference image, a reference features generator, a dynamically configurable image processing module, an augmented reality device, an augmented reality system, and a computer program product using such methods.

Due to the increasing capabilities of multimedia devices, mobile augmented reality (AR) applications are rapidly expanding. These AR applications allow enrichment (augmentation) of a real scene with additional content, which may be displayed to a user in the form of a graphical layer overlaying the real-world scenery. The augmentation thereby provides an "augmented reality" user-experience.

Augmented reality platforms, such as the Layar Vision platform, allow an AR application to recognize an object in an image frame and to render and display certain content together with the recognized object. In particular, an AR application may use vision-based object recognition processes to recognize whether a particular object is present in the scene. Furthermore, the AR application may use a pose estimation process to determine position and/or orientation (pose information) of the object based on information in the image frame and sensor and/or camera parameters. The pose information is then used to generate the augmentation for the object.

Examples of known image processing algorithms for object recognition and tracking are described in the article by Duy-Nguygen Ta et al. "*SURFrac: Efficient Tracking and Continuous Object Recognition using local Feature Descriptors*" IEEE Computer Society Conference on Computer Vision and Pattern Recognition (CVPR'09), Miami, Fla., Jun. 20-25, 2009. Object recognition may include extracting features from the image frame and matching these extracted features with reference features associated with objects stored in a database. By matching these reference features with the extracted features, the algorithm may determine that an object is "recognized". Thereafter, the recognized object may be subjected to a sequential estimation process (tracking) wherein the new state of the object is estimated on the bases of new observables (e.g. a new image frame) and the previous state of the object determined on the basis of a previous image frame. The aforementioned process may be repeated for each camera image frame at a sufficient fast rate, e.g. 15 to 30 frames per second, in order to ensure that the visual output on the display is not degraded by jitter or other types of flaws.

A reference features set is created from the original reference image of the object such as the image of a full-paged magazine advertisement or the image of a billboard. Having the reference features set, the AR device can perform object recognition and tracking by matching each of a plurality of reference features sets against the extracted features set from the image captured by a camera of the AR device. In practice, object recognition and tracking work best when a sufficient amount of or sufficiently enough features of the reference features set can be matched with the features of the current camera image frame. But as soon as a user moves the camera closer to the actual object, less of the reference features set can be found matching the features in the current camera image frame. At some point, the ability to perform object recognition and/or tracking will be lost, since not enough reference features can be found in the camera image frame to allow for object recognition and/or tracking to successfully occur.

Accordingly, there is a need to provide improved methods and systems that at least alleviate some of these problems.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Hereinafter, embodiments of the disclosure aiming to alleviate the problem(s) described above will be described in further detail. It should be appreciated, however, that these embodiments may not be construed as limiting the scope of protection for the present disclosure. For instance, combinations of any of the embodiments and limitations are envisioned by the disclosure.

A method of generating reference features sets on the basis of a reference image of an object is disclosed. Said reference features sets may be for use in an image processing function configured to recognize the object and/or estimate pose information of the object from an image frame obtained from a digital imaging device by matching extracted features of the image frame with the reference features sets. A first reference features set may be extracted from the reference image. A first slice of the reference image may be obtained, wherein the first slice is a first portion of the reference image. A second reference features set on the basis of the first slice may be extracted or generated. A reference features set may be a grouping of extracted features and/or a set of plurality of features extracted from a particular reference image or slice of a reference image. By slicing the reference image, reference features sets enables tracking and/or pose estimate to occur properly when the object appears "zoomed-in".

Obtaining a slice of the reference image may be done by obtaining a portion of the reference image as the first slice in accordance with a pre-defined slicing template. Said slicing template may define at least one area within the border of the reference image. A pre-defined slicing template may be defined without regard to input from the provider of the reference image or the reference image itself. For instance, the pre-defined slicing template may divide an image into 2, 4, 5, 6, 9 portions, etc.

In some embodiments, a slice of the reference image may be obtained by receiving user-defined input defining at least a location and/or an area within the border of the reference image and using the user-defined input as such to obtain the slice. Advantageously, e.g., the provider of the reference image can specify which areas to create the slice, which may be more accurate or informative about the reference image than the pre-defined template. In certain embodiments, the user-defined input may define a slicing template.

According to one embodiment, obtaining the first slice of the reference image comprises determining an area of saliency of the reference image, preferably by determining an area of the reference image where features extractable from the reference image are concentrated, and obtaining the first portion of the reference image on the basis of the area of saliency. Usually, users are more likely to "zoom in" onto areas of an object that is important and/or salient. Advantageously, by having a slice for salient areas, a reference features set is available to enable object recognition and/or pose estimation to occur when the user is "zoomed in" onto that part of the object.

Slicing may be performed recursively. For instance, slice(s) may be created/obtained from other slice(s), such that a reference features set is available when the user "zooms in" even further. According to one embodiment, a second slice is obtained from the first slice, wherein the second slice is a first portion of the first slice, a third reference features set is generated on the basis of the second slice.

Slices may also overlap each other, such that unstable regions (where an image processing function may switch back and forth between reference features sets) may be reduced. According to one embodiment, a third slice of the reference image may be obtained, wherein the third slice is a second portion of the reference image, and the first portion of the reference image overlaps with the second portion of the reference image.

Information resulting from the slicing process may be used to better utilize the reference features sets and/or to optimize the accuracy and/or efficiency of the image processing function. In some embodiments, metadata is generated for the reference image, the first slice, the second slice, and/or the third slice, said metadata comprising information indicating the hierarchical relationship between the reference image and the first slice. Optionally the metadata comprises at least one of: hierarchical relationship information, parent-child relationship information, sibling relationship information, relative distance information, relative positioning information, and sizing information.

A reference features generator configured to implement the methods disclosed herein is described in this disclosure.

A method of dynamically configuring an image processing function executable iteratively on a series of image frames is disclosed herein. Said image processing function may comprise (1) extracting features from an image frame, (2) matching extracted features with a plurality of reference features sets associated with at least one object, and (3) estimating pose information on the basis of features from extracted features that matches the features in a matching reference features set. An object is detected in a previous image frame on the basis of the matching reference features set. Metadata associated the matching reference features set may be obtained, wherein said metadata may comprise information indicating the relationship of the matching reference features set with other reference features set(s) in the plurality of reference features sets. In some embodiments, said metadata may comprise at least one of: hierarchical relationship information, parent-child relationship information, sibling relationship information, relative distance information, relative positioning information, and sizing information. Said image processing function may be configured on the basis of the metadata, such that the image processing function is executed differently for a following image frame.

Configuring said image processing function on the basis of the metadata may comprise determining, from the metadata, which of the other reference features set(s) is related to the matching reference features set, and/or determining, from the metadata, which of the other reference features set(s) is not related to the matching reference features set.

Further, configuring said image processing function on the basis of the metadata may comprise configuring said image processing function, using said identity information, to more quickly recognize an object and/or more accurately determine pose information from the reference features set(s) that is related to the matching reference features set, and/or configuring said image processing function, using said identity information, to disregard reference features sets that is not related to the matching reference features set.

According to one embodiment, configuring said image processing function on the basis of the metadata may comprise determining, from the metadata, which of the other reference features set(s) is related to the matching reference features set, and configuring said image processing function, using said identity information, to more quickly recognize an object and/or more accurately determine pose information from the reference features set(s) that is related to the matching reference features set.

According to one embodiment, configuring said image processing function on the basis of the metadata may comprise determining, from the metadata, which of the other reference features set(s) is not related to the matching reference features set and configuring said image processing function, using said identity information, to disregard reference features sets that is not related to the matching reference features set.

In some embodiments, configuring said image processing function on the basis of the metadata comprises providing the metadata and/or an identifier associated with the matching reference features set as input to a mapping function. A configuration for the image processing function may be received as an output from the mapping function. Optionally said configuration comprises at least one of: at least one parameter for configuring the image processing function, and at least one identifier for at least one reference features set, wherein said at least one identifier is associated with the at least one parameter for configuring the image processing function. Said image processing function may be dynamically configured using the configuration from the output of the mapping function.

A dynamically configurable image processing module is disclosed. The module may include one or more processors configured to execute a processing function executable iteratively on a series of image frames, said image processing function comprising (1) extracting features from an image frame, (2) matching extracted features with a plurality of reference features sets associated with at least one object, and (3) estimating pose information on the basis of features from extracted features that matches the features in a matching reference features set. Said one or more processors may be configured to detect an object in a previous image frame on the basis of the matching reference features set. The module may include a controller configured to obtain metadata associated with the matching reference features set, wherein said metadata comprises information indicating the relationship of the matching reference features set with other reference features set(s) in the plurality of reference features sets. The controller may configure said image processing function on the basis of the metadata, such that the image processing function is executed differently for a following image frame.

An augmented reality device is disclosed. Said device may include an image sensor for generating image frames. The device may further include a dynamically configurable image processing module for detecting one or more target objects in an image frame and for generating pose information associated with at least one detected object. The device may also include graphics generator for generating a graphical item associated with said detected object on the basis of said pose information.

An augmented reality system is disclosed, which includes a features storage comprising a plurality of reference features sets associated with one or more objects, a content storage comprising one or more content items associated with the one or more objects, and at least one augmented reality device, said augmented reality device communicably connected to the features storage and the content storage.

The augmented reality system may comprise a reference features generator.

The disclosure may also be related to a computer program product, implemented on computer-readable non-transitory storage medium, the computer program product configured for, when run on a computer, executing the method according to any one of the method steps described above.

The disclosed embodiments will be further illustrated with reference to the attached drawings, which schematically show embodiments according to the disclosure. It will be understood that the disclosure is not in any way restricted to these specific embodiments.

BRIEF DESCRIPTION OF THE DRAWINGS

Aspects of the disclosure will be explained in greater detail by reference to exemplary embodiments shown in the drawings, in which:

FIGS. 3A-D depicts illustrative slicing methods, according to some embodiments of the disclosure;

DETAILED DESCRIPTION OF THE ILLUSTRATIVE EMBODIMENTS

Figure 1A:
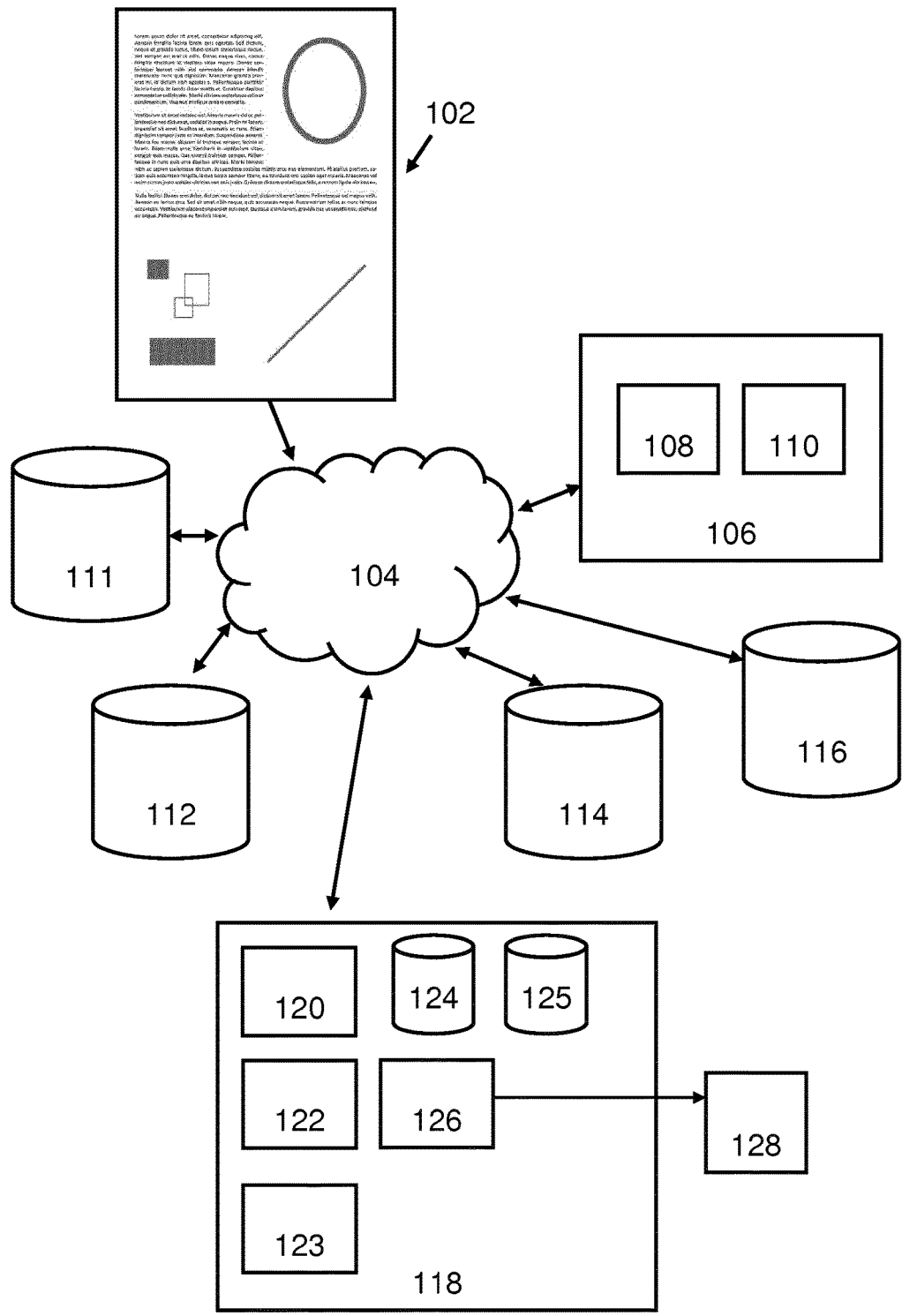
FIG. 1A depicts an exemplary original reference image of an object and an exemplary augmented reality system, according to one embodiment of the disclosure.

FIG. 1A depicts an exemplary (original) reference image of an object and an exemplary augmented reality system, according to one embodiment of the disclosure. Generally, an augmented reality client provides augmented reality to a user by recognizing an object captured in a camera image frame, and/or generating graphics for the object on the basis of pose information that is estimated from the camera image frame.

An entity interested in providing augmented reality content may provide a reference image 102 of the object (e.g., over a communication network 104) to an augmented reality server 106. The reference image of the object may be an image and/or a photograph of the object, and the reference image may be stored in a reference images storage 111. The object of interest, for purposes of discussion, may be a poster. The reference image of the object of interest may be an electronic image, such as a raster image, a vector image, or any suitable digital representation of the two-dimensional image. The reference image may comprise at least one of: text, shape, photograph, graphical shape, etc. Content to be used for generating augmentation for the object may be stored in a content storage 112.

A first reference features extraction function 108 of the augmented reality system may extract (or generate) a set of reference features (i.e., specific structures in an image such as edges or corners) from the reference image and store at least one reference features set in a reference features sets storage 114. The storage may store data associated with the particular reference features set or data associated with the object to which the reference features set belong, such as an identifier.

An augmented reality client 118 may be configured to access the reference features sets storage 114, such that reference features sets associated with various objects of interest may be obtained for purposes of object recognition and/or tracking. The reference features sets may be stored in a local reference features sets storage 124. The augmented reality client may further comprise a second reference features extraction function 120 to extract (or generate) features (referred to an extracted features set) from a camera image frame captured by an imaging device (not shown).

Using the reference features sets and the extracted features set, an image processing function 122 may perform object recognition and/or tracking to determine the identity and pose information of an object. The identity of the object may be used to obtain associated content from the content storage. A graphics generating function 126 may use the estimated pose information and the obtained content to generate an augmentation 128. The resulting augmentation is provided as part of an augmented reality user experience.

Object recognition typically involves a matching process where features in an extracted feature set from a camera image frame are matched against features from a plurality of reference features sets (e.g., stored in local reference features sets storage 124). The object recognition process may determine a set of matching features, i.e., extracted features that match sufficiently well with the features in a reference features set. Tracking may involve estimating pose information on the basis of matches found between the features in the extracted feature set and the features in the reference features sets (may be referred to as "matching features"). The reference features set producing a sufficient number of matching features may be referred to as a matching reference features set. In some embodiments, the reference features set producing an object recognition and/or pose estimation result is referred to as a matching reference features set.

The success of object recognition and/or tracking depends on the extracted features set that is generated from the camera image frame. Generally speaking, when enough features from the reference features set are present in the extracted features set, it is more likely that the identity of the object and pose information may be successfully determined and/or estimated.

Figure 1B:
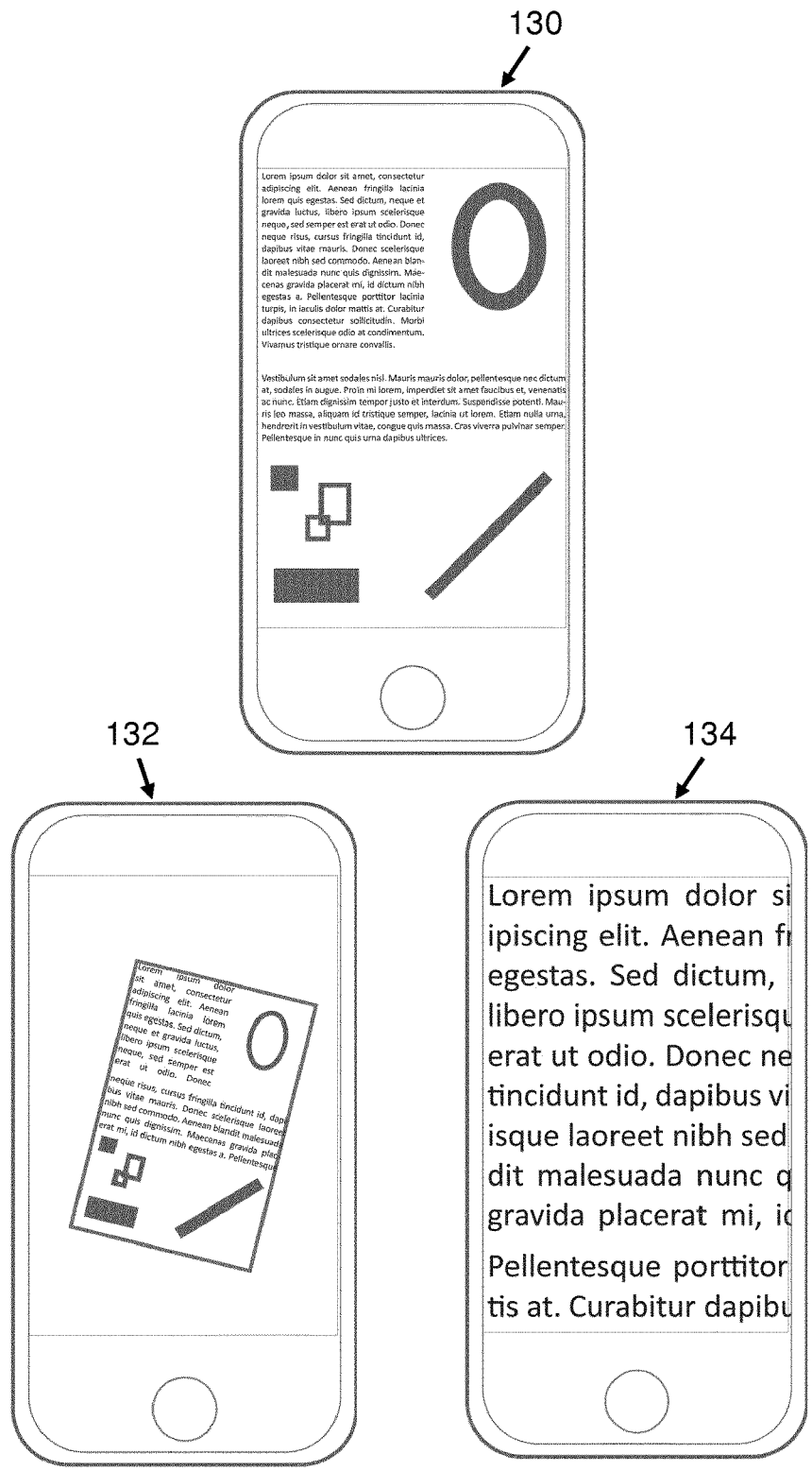
FIG. 1B depicts illustrative augmented reality devices held at various distances from the object.

FIG. 1B depicts illustrative augmented reality devices held at various distances from the object. For instance, as seen in illustrative device 130, the object of interest takes up substantially the entire camera image frame (as seen on the screen of said device). Accordingly, (holding other factors constant) object recognition and/or tracking would work well (substantially exactly) because the features in the extracted features set from the camera image frame matches well with the features in the reference features set of the reference image 102 (of FIG. 1A).

In another instance, as seen in illustrative device 132, the object of interest is shown completely in the camera. The user device (i.e., the camera) may be positioned farther away from the object of interest, thus the camera image frame appears "zoomed out". Object recognition and/or tracking is likely to continue to work well because the features in the reference features set can still be found matching the features in the extracted features set of the camera image frame. Thus, the extracted features set from the camera image frame can still be matched with the reference features set of the reference image 102. This is especially true if the extracted features set comprises scale-invariant features and/or if a plurality of features sets are extracted from the reference image 102 at various scales.

In practice, object recognition and tracking work best when the features from the reference features set can be successfully matched with the features extracted from the current camera image frame (i.e., features of the extracted features set). But as soon as a user moves the camera closer to the actual object, less of the reference features set of the reference image 102 are visible and/or present. At some point, the ability to perform object recognition and/or tracking will be lost, since not enough reference features can be found in the camera image frame to allow for object recognition and/or tracking to successfully occur.

For instance, as seen in illustrative device 134, only a part of the object of interest is shown on the screen. The camera image frame captures only a part of the object of interest. The user device (i.e., the camera) may be positioned closer to the object of interest, thus the camera image frame appears "zoomed in". In some embodiments, the camera image frame may be "zoomed in" because the user is zooming into the scene because the imaging device of the user device may have an optical or digital zoom functionality. Object recognition and/or tracking does not work well because not enough reference features are present or visible in the camera image frame (not enough features in the reference features set can be found matching the features in the extracted features sets). This situation may arise when the user cannot physically hold the camera or position the camera to capture the entire object of interest in the camera image frame, or when the user wishes to look at a part of the object of interest more closely (by using an optical/digital zooming functionality of the imaging device and/or by moving the imaging device closer towards the object of interest). Augmented reality systems provide the user the freedom to move around the real world. Therefore, it is preferred that augmented reality systems can also carry out object recognition and/or tracking even when the camera is positioned at various distances from the object of interest.

One way of alleviating the problem above is to extract more features from the original reference image, i.e., extract features at a higher resolution and/or using a version of the reference image having a higher resolution. In this manner, even when the current image frame is only showing a part of the object, enough reference features (from the reference features set that was extracted at a higher resolution) can be found matching the features in the current image frame. However, increasing the number of features in a reference features set has two negative side effects. One, the increased number of features in a reference features set leads to higher consumption of computational resources, because each extracted feature is matched against each feature in a reference features set. Two, the increased number of features may lead to more false-positives in object recognition and/or pose estimation, because more features in a particular reference features set increases the chance that an object is falsely detected. One other (more advantageous) way of alleviating the problem above is to generate reference features set(s) from at least one partial image of the original reference image (herein referred to as a "slice" or if plural "slices"). As a result, not only is a first reference features set generated for the original reference image, at least one other reference features set(s) is generated for the partial image(s) of the original image. Note that although more reference features are being used for image processing, the additional reference features set(s) generated for a slice(s) is partitioned/separate from the first reference features set of the original reference image.

Even when only a part of the object is visible in the camera image frame, object recognition and/or tracking can still successfully occur because enough features in the extracted features set of the camera image frame can be found matching the features in the reference features set of a partial image. The object, even though appearing "zoomed in" in the camera image frame, can still be recognized and tracked, e.g., using the reference features set generated from a slice of the original reference image (corresponding to the part of the object that is visible in the camera image frame). The advantageous effect of slicing is applicable for both scale-invariant or non-scale-invariant features.

By slicing the reference image into slice(s) and generating a reference features set for each of the slice(s), the additional reference features set generated for the particular reference image (i.e., the reference features set(s) generated for the slice(s)) is partitioned from the reference features set of the original reference image. The augmented reality client is given the opportunity to better distribute or allocate the computational cost in the image processing function over the various reference features sets when it is partitioned. For instance, the augmented reality client may decide at different times which of the various reference features sets to process, or how coarsely/finely should each of the reference features sets be processed in the image processing function. Partitioning of various reference features sets provides flexibility. Note that if one simply extracts a larger reference features set at a higher resolution to solve the problem, the image processing function has no choice but to also process those additional reference features each time the reference features set is used.

Furthermore, the system may decide or choose certain portions of a particular reference images to be made into a slice and generate additional reference features set(s) thereof. This allows more flexibility in determining where the system could expend more computational costs or resources in generating and using the additional reference features sets generated for the slices, when compared to the solution of generating more features from the original reference image at a higher resolution.

Furthermore, because the reference features sets of the original reference image and the slice(s) are partitioned, the chance of falsely detecting an object is not as high, when compared to the solution of generating more features from the original reference image at a higher resolution. The partitioning enables the possibility of false-positives to be contained within each reference features set.

Referring back to FIG. 1A, a slicing function 110 may be provided in, e.g., the augmented reality server, such that slices may be obtained or created from an original reference image 102. Said slices may be stored with other reference images in the reference images storage 111. Reference features set(s) may be generated on the basis of a slice using the reference features extraction function 120 in the augmented reality client 118. Said reference features set(s) may be stored in reference features sets storage 114 and/or local reference features sets storage 124. An exemplary original reference image and its slices are described in relation to FIG. 2. Illustrative methods for generating/obtaining slices are described in relation to FIG. 3.

Slices have spatial relationship information with each other (e.g., positioning, sizing, neighboring information, distance, etc.). Moreover, slices and the original reference images may have hierarchical/family relationship(s) with each other (e.g., whether a particular slice had originated from another slice or an original reference image, parent-child relationship, sibling relationship, etc.). Said relationship information may be available as a result of the slicing function. Relationship information associated with slices and/or reference images may be stored as metadata in a metadata storage 116. The metadata may be generated by the slicing function. An augmented reality client may store the metadata locally at a local metadata storage 125.

On the basis of the relationship information (i.e., metadata), the image processing function of the augmented reality client may be dynamically configured such that efficiency and/or accuracy of the image processing function is improved. For instance, the relationship information may be used as a heuristic to improve the image processing function. Exemplary metadata having spatial relationship information and hierarchical relationship information is explained in relation to FIG. 4. Illustrative methods for using the relationship information and/or the metadata are described in relation to FIGS. 5-8. In some embodiments, a controller 129 is provided to dynamically determine a configuration for the image processing function. The determined configuration may be used by an image processing function for processing the next or a following camera image frame. Generally, the controller may monitor whether an object has been successfully detected in a camera image frame. Furthermore, the controller may monitor which of the reference features set (e.g., represented as an identifier for the reference features set) gave the successful detection result. Based on knowing whether an object has been detected and/or which of the reference features set gave the successful detection result, the controller may retrieve the relationship information (e.g., in the metadata) associated with the object and/or reference features set. Knowing which of the reference features set gave the successful detection result and its (or their) associated metadata, the controller may determine a configuration for the image processing function.

The controller may be configured with a mapping function (e.g., a look up table, a series of cases statements, etc.) that receives at least one variable and outputs the configuration for the image processing function. The variables may take values such as:
  whether at least one object has been detected,
  the identifier associated with a reference features set that produced a detected object,
  metadata associated with the detected object and/or the reference features set that produced a detected object,
  information relating to the above exemplary values for at least one previous camera image frame, and
  and indicators of the exemplary values, alone or in combination, of the above.

In one embodiment, the reference features sets under consideration by the image processing function may change depending on the relationship information associated with a previously detected object. In another embodiment, parameters to the image processing function may be adjusted for particular reference features set(s) depending on the relationship information associated with a previously detected object. For instance, a subset of reference features sets (e.g., determined on the basis of the relationship information) may be processed differently from other reference features sets.

Accordingly, the determined configuration may comprise, e.g., parameters for adjusting the image processing function and/or any sub-functions therein. In this manner, different image frames may be processed differently by the image processing function. Efficiency and/or accuracy may be optimized. In some embodiments, the determined configuration may comprise a set of reference features sets and/or identifiers thereof. In certain embodiments, the determined configuration may comprise parameters to be used for at least some of the reference features sets.

In certain embodiments, the controller may comprise a state machine for determining dynamically the configuration for the image processing function. Details relating to exemplary states are described in relation to FIGS. 7 and 8.

Furthermore, spatial relationship information may be used by the graphics generating function 126 of the augmented reality client 118 to generate augmentations.

Although shown as separate entities, at least a part of the functions, storages, server and client architecture may be selectively combined and implemented under another system architecture. For instance, at least part of the augmented reality server may be implemented with the augmented reality client, and vice versa. In another instance, at least part of the augmented reality server and/or client may be implemented in a distributed fashion. Storage elements may be provided in the server and/or the client, or may be provided in a distributed fashion accessible over the communication network.

Figure 2:
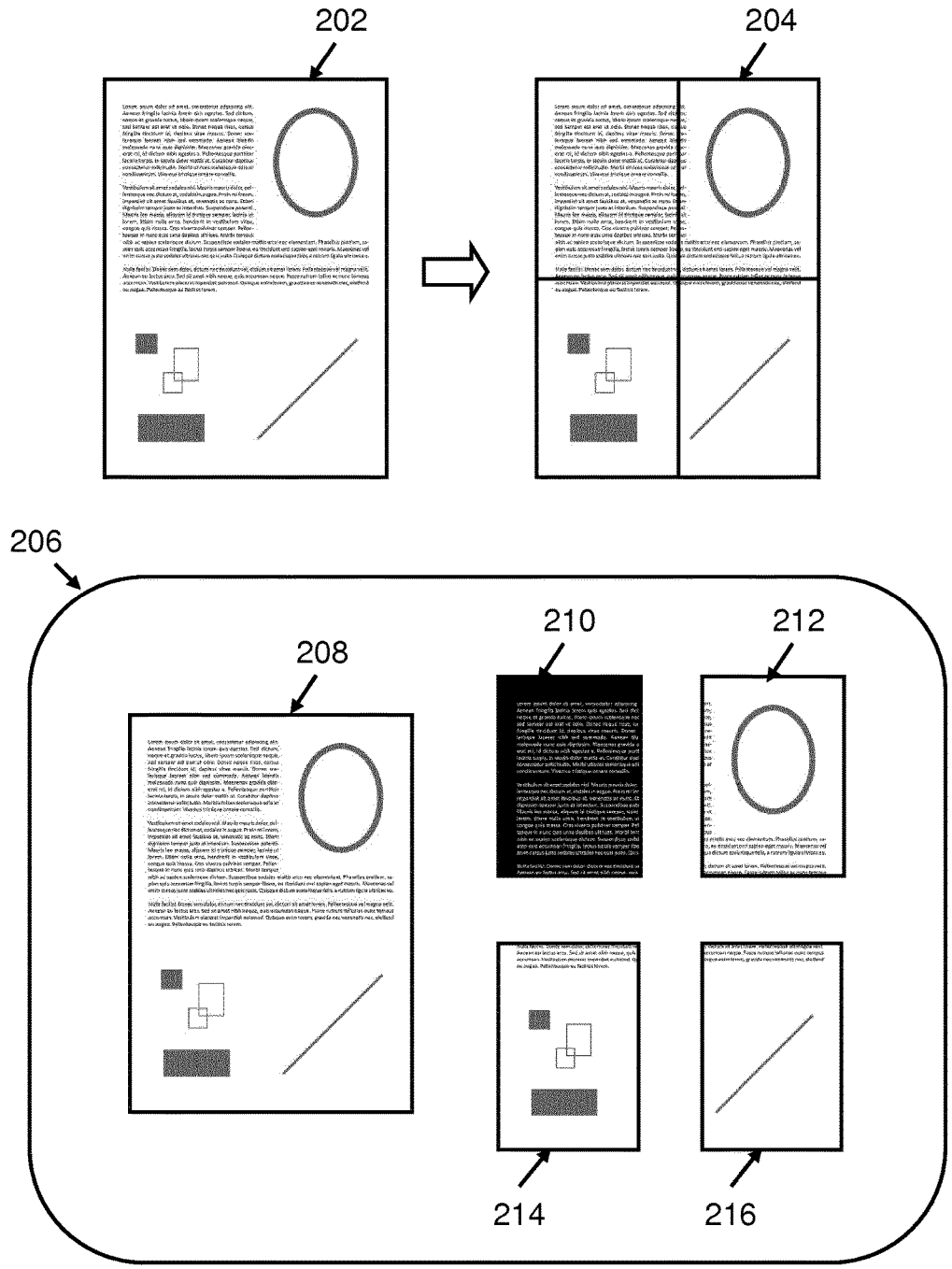
FIG. 2 depicts an exemplary reference image and its respective slices, according to one embodiment of the disclosure.

FIG. 2 depicts an exemplary reference image and its respective slices, according to one embodiment of the disclosure. The original reference image 202, is sliced, e.g., using a slicing function, as shown in the slicing illustration 204, into four (4) partial images ("slices"). Each of the partial images is processed to generate respective reference features sets. The reference features set for a partial image is also used in object recognition and/or tracking processes. As such, even when the image captured by the camera of the AR device only has a part of the object of interest, object recognition and/or tracking can still occur successfully because enough features can be found matching the reference features of the partial image corresponding to the part of the object that is in the camera image frame. Advantageously, by having a reference features set of a partial image of the original image, the reference features can be found as a match with the extracted features set (i.e., from a camera image frame) even when only a part of the object is in the camera image frame.

In this embodiment, reference features sets are extracted for the original reference image and each of the slices. The original image and each of the slices are denoted by grouping 206, indicating that the original image 208 and the slices 210, 212, 214, and 216 all belong to the same object, i.e., the original reference image and the slices are associated with each other. Such grouping may be stored as relationship information as metadata.

In operation, when the camera image frame is showing the entire object, the camera image frame has substantially an extracted features set similar to the reference features set of the original image. As such, the object recognition and/or tracking processes would successfully occur on the basis of the reference features set of the original image. When the camera image frame is showing substantially less than the entire object, e.g., such as the upper left quadrant portion of the object (as seen in FIG. 1B, illustrative device 134) then the object recognition and/or tracking processes would (still) successfully occur on the basis of the reference features set of slice 210. The features extracted from the camera image frame showing the left upper quadrant would be found matching the reference features set of slice 210, enabling object recognition and/or tracking to occur properly.

Likewise, when the camera image frame is showing the lower right quadrant portion of the object, then the object recognition and/or tracking processes would successfully occur on the basis of the reference features set of slice 216. The features extracted from camera image frame would be found matching the reference features set of slice 216, enabling object recognition and/or tracking to occur properly.

If reference features set of the slices are not available, the ability to perform object recognition and/or tracking would have been lost when the camera image frame is only showing substantially less than the entire object, or "zoomed in". Augmentations are provided on the basis of the result from the object recognition and/or tracking processes, therefore when the object appears "zoomed in" and the ability to perform object recognition and/or tracking is lost, then the ability to provide augmentations is also lost (e.g., the previously generated augmentation shown to the user would disappear from the display of the AR device).

One way of creating slices is by dividing an image into two, three, four or more distinct portions without overlapping. For instance, FIG. 2 shows how a reference image may be divided such that four slices are created. When dividing an image into distinct portions, there may be at least one meeting point or edge: corner points or lines/edges where a plurality of slices may meet each other corner to corner or side by side. If the camera image frame is showing the meeting point or edge where a plurality of slices are generally taking up the same amount of space in the camera image frame, the result of the image processing function may appear unstable as it switches from one slice to another frame after frame. It is possible that the ability to perform object recognition and/or tracking may be even be lost because not enough reference features of slices are present to make a good enough match. For instance, if the camera image frame shows the meeting point where four slices meet near the center of the camera image frame (where the four slices are appearing in the camera image frame substantially equally), the reference features set(s) from which the image processing function may detect an object could switch between the meeting slices quickly between frames, creating an unstable process.

Besides slicing a reference image into four slices, as described in relation to FIG. 2, other ways of creating slice(s) are envisioned. FIGS. 3A-D depicts illustrative slicing methods, according to some embodiments of the disclosure, at least some of which may reduce the meeting points where the image processing function may be unstable.

FIG. 3A shows one way to avoid the unstable meeting point by creating a slice that is around the unstable meeting point. As seen in the example, the slicing process generates an additional reference features set created for the additional slice. As such, reference features sets are generated for the original image and five slices. Accordingly, when the camera image is showing the meeting point where a plurality of slices is shown substantially equally, the image processing function would find the reference features set of the additional slice to be the best match, in a stable manner.

FIG. 3B shows another way to avoid the unstable meeting point. The slices may be made such that the slices overlap each other (in content, area, space, and/or region of the reference image). As a result, the slices may have a larger size. However, if the camera image frame is displaying the overlapping portion, the image processing function would remain stable because enough reference features would be present to make a good match for the overlapping slices, and the ability to perform object recognition and/or tracking is not lost.

In some embodiments, slices may be automatically generated, based on a pre-defined way of slicing (or template) the original reference image. However, other methods of generating slices in addition to or alternative to using a pre-defined template are also envisioned.

Slices may be generated on the basis of at least one characteristic of the reference image, instead of using a pre-defined template. For instance, the original reference image may be processed for features, and areas of where features are concentrated are determined. The distribution of features (indicating areas of where features are concentrated) may then be used to define areas where slices may be generated. Advantageously, the slices that are generated using this method would already have sufficient features to enable successful object recognition and/or tracking to occur. Otherwise, slicing templates may create slices where there are insufficient features. Furthermore, the concentration of features may indicate that area of the reference image has salient content that where the user is likely to look more closely, or "zoom into". As such, it is likely that the image processing function can benefit more from having a reference features set created for a slice of that salient area of the reference image.

Other characteristics of the image, besides the distribution of features, may be used to determine the area of saliency in the reference image. For instance, the point of focus (e.g., where the image is the sharpest) may be used to determine an area of the reference image in which a slice should be created. In another instance, the point where the image is the brightest or darkest may be used to determine an area in which a slice should be created. In yet another instance, contrast information may also be used to determine the area. As one skilled in the art would appreciate, other detection methods for determining salient areas of the image may be used for purposes of determining slices.

Slices may be generated on the basis of user-specified input. For instance, a content provider providing the original reference image would also define the location in which the augmentation should appear on the object. A user is likely to "zoom into" the area where the augmentation would appear. Accordingly, at least one slice is preferably created in around the location in which the augmentation would appear.

In another instance, a content provider providing the original reference image may provide user input indicating the areas where slices should be created. For example, a graphical user interface may be provided to the content provider to provide the coordinates and size of the slice(s) to be created. The content provider may use a drag and drop function to define the area on the reference image where a slice may be created. The resulting slices can be seen in the illustration shown in FIG. 3C.

Besides slicing the original reference image into its slices, it is also possible to recursively slice the slices into smaller slices, as seen in the exemplary illustration of FIG. 3D. The slices at each step of the recursive slicing may be generated automatically using the methods discussed above and/or generated based on user-specified input.

Using any suitable method for creating the slices from an original reference image, the slicing function may produce relationship information for the slices and/or reference image such that the information may be used to improve the efficiency and/or accuracy of object recognition and/or tracking.

Figure 4:
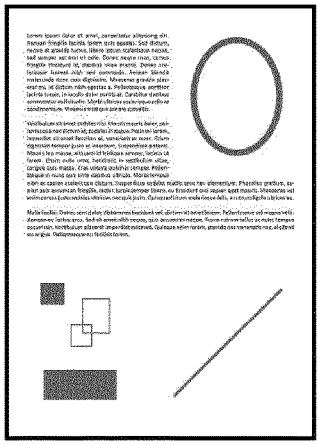
FIG. 4 depicts illustrative metadata associated with a particular object, an original reference image, and its respective slices.
Figure 4:
Figure 4:
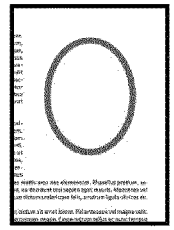
Figure 4:
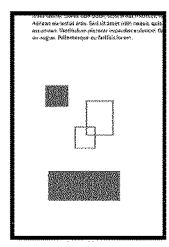
Figure 4:
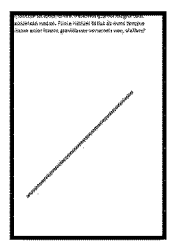

FIG. 4 depicts illustrative metadata associated with a particular object, an original reference image, and its respective slices. Generally, the metadata may be produced as a result of the slicing function, provided as a data structure for describing the relationship of the reference features sets with each other. For instance, metadata provides a data structure where the grouping of reference features sets belonging to the same object or page is indicated. Furthermore, metadata may provide a data structure where the relationship between a slice and its parent original reference image is indicated. Furthermore, the metadata may provide a data structure where the relative distance, the relative positioning and/or size of a slice in relation to the parent original reference image and/or other slices of the original reference image is indicated.

The metadata associated with the object, shown as Page A in this embodiment, comprises an identifier and a list of identifiers in the grouping. The identifier of the object is "A", or any suitable identifier that substantially uniquely identifies the object from other objects of interest. The identifier of the object generally enables a graphics generator to retrieve the content associated with the particular object, such that a graphical item may be generated and provided as augmentations for the particular object. The list of identifiers in the grouping comprises identifiers of the original reference image and the slices of the original reference image.

The metadata associated with a reference image and/or the slice comprises an identifier that substantially uniquely identifies the reference image and/or the slice from others. For instance, the original reference image comprises the identifier ID: A01. In another instance, SLICE 02 comprises the identifier ID: A02. The identifier for the reference image and/or the slice may indicate the object that the reference image and/or the slice belong to (e.g., the character "A" in the identifier indicates that the reference image and/or the slice belongs to Page A).

For the original reference image and the respective slices, the metadata may identify the object that the reference image or slice is associated with (seen as "Page ID"), and an identifier that substantially uniquely identifies the original reference image (seen as "ID").

Exemplary metadata is reproduced below:

| ORIGINAL REFERENCE IMAGE | |
|---|---|
| Page ID | A |
| ID: | A01 |
| Parent ID: | — |
| Children IDs: | A02, A03, A04, A05 |
| Size: | (100, 100) |
| Anchor: | (0, 0) |
| Offset: | (0, 0) |
| SLICE 03 | |
| Page ID | A |
| ID: | A03 |
| Parent ID: | A01 |
| Children IDs: | — |
| Size: | (50, 50) |
| Anchor: | (0, 0) |
| Offset: | (50, 0) |

Furthermore, the metadata may identify the parent-child and/or sibling relationship(s) between the original reference image and the respective slices. The metadata may comprise a data structure for indicating the parent image from which a slice was created and/or which child slice(s) was created using the image. Although this example shows only one parent and one generation having a plurality of children, it is possible that the parent-child relationship comprises further levels in the hierarchy. This may be applicable if slices are created recursively, or further slices are created from slices of the original image.

Advantageously, the metadata identifying the parent-child relationship enables the image processing function to appropriately disregard reference features sets belonging to other objects that had not been previously detected. Furthermore, the metadata identifying the parent-child relationship enables the image processing function to identify and consider the reference features sets belonging to the same object, namely the object that was previously detected.

Sibling information indicating that a plurality of slices originated from the same reference image and/or that they are adjacent and/or close to each other may enable the image processing function to determine which reference features sets are likely to be successful in detecting an object in the next camera image frame. Accordingly, the image processing function may be configured to process those reference features sets differently in the next camera image frame.

Moreover, the metadata may comprise data for describing the size and/or relative positioning of the original reference image and/or the slices. The size may include the size of the image from which the reference features set was generated. For instance, the size may be a pair of numbers, such as the number of pixels in the X and Y axes. The relative positioning may include the coordinate information of the image in relation to the original reference image and/or a parent image from which a slice is created. The relative positioning information may be a pair of numbers, e.g., in terms of the coordinate system provided for the original reference image. For instance, the relative positioning information may include the X and Y coordinates of the upper left most corner of the image with respect to the original image.

Advantageously, sizing and positioning metadata enables the graphics generation function to generate augmentations for the object. For instance, the positioning of an augmentation for a particular object comprises location coordinates of the augmentation with reference to the original reference image. If the image processing function estimates the pose information using the reference features set of a slice of the original reference image, the augmentation may be generated on the basis of the estimated pose information, the sizing and/or relative positioning of the slice, and location coordinates. The graphics generation function may translate the location coordinates into the coordinates with reference to the slice using the sizing and/or relative position of the slice.

In some embodiments, the metadata comprises data for describing an anchor point. The relationship between anchor points and offsets may be transitive across the hierarchy slices on a page, i.e. the placement of augmentations can be encoded with respect to the parent slice. The anchor point influences the placement of the other slices (given their offsets) and respectively of the augmentations. The anchor point may be arbitrarily defined. An anchor point of (0,0) may would describe the top left corner, whereas (50,50) would be the center point given a size of (100,100). If the anchor point of A01 was defined as (50,50), then the slices A02-A05 would have offsets of: (−50,−50), (0,−50), (−50,0), (0,0) for four equal-size quarter slices on the top left, top right, bottom left, bottom right. Addition of offset and anchor point of the parent gives the placement of a slice in coordinates of the parent system.

In some embodiments, the metadata for the relative positioning of the original reference image and/or slices are described in two dimensions. In certain embodiments, the metadata for the relative positioning of original reference image (or object) and/or slices are described in three dimensions and/or in another reference system.

The (spatial) relationship may comprise a two-dimensional transformation, where slices are also rotated in arbitrary angles with each other. In some instances, the relationship may comprise a three-dimensional Euclidean transformations.

The transformation may be expressed by a 3×3 homogeneous transformation matrix, where the upper left 2×2 submatrix may describe the rotation and scaling, and the upper right 2×1 column vector may describe the translation (e.g., the last row of the matrix is (0,0,1)). Alternatively or additionally, the transformation may be expressed by a respective 4×4 homogeneous transformation matrix, with the upper left 3×3 sub-matrix describing rotation/scaling and a 3×1 vector for the translation in the upper right 3×1 column vector (e.g., the last row of the matrix is (0,0,0,1)).

Expressing the relationship between reference images as a full 3D transformation matrix advantageously provides a flexible way to apply slicing to objects of interest that have a three-dimensional character and compose appropriate metadata thereof. For example, images can be arranged in a box shape, a bent/folded shape, or any other shape that is composed of substantially flat surfaces that can be made into slices. Slices may still have a parent/child/sibling relationship, and the relationship between the respective transformations is equally transitive (chain of transformations; transformations can be inversed, etc.).

Figure 5:
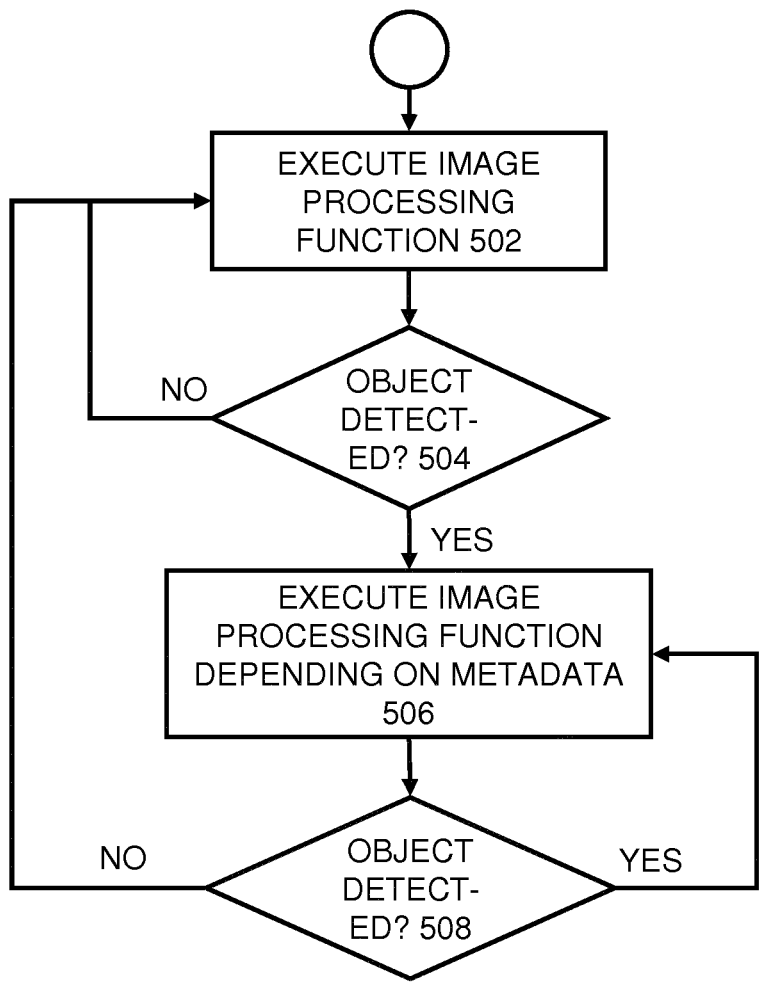
FIG. 5 depicts an exemplary flow diagram associated with a method for dynamically configuring an image processing function according to an embodiment of the disclosure.

FIG. 5 depicts an exemplary flow diagram associated with a method for dynamically configuring an image processing function according to an embodiment of the disclosure. Because metadata associated with the reference image(s) and slice(s) convey extra information about the relationship between the reference features sets, the metadata can be leveraged to improve the efficiency and/or the accuracy of the image processing function. Based on whether an object has been detected or not (and if so, the identity of the object or the reference features set that produced the detection result) and the metadata associated with the object (or the reference features set that produced the detection result), a controller may be configured to determine a configuration for the image processing function.

When a user is holding a user device, "zoomed-in" to an object of interest, the user may move the camera of the user device over different parts of the object of interest. If the user is likely to continue pointing the camera at the object of interest, the image processing function (comprising object recognition and/or tracking) may be dynamically adjusted based on whether an object has been detected. For instance, a controller may take at least one input and output configuration for the image processing function. Using the metadata associated with the object and/or the reference features set that produced the detection result, the image processing function may be configured differently for the next image frame.

In the context of this disclosure, an object is considered detected if object recognition has successfully identified the object as a good enough match on the basis of one or more reference features sets, and/or if tracking has successfully estimated the pose information of the object on the basis of one or more reference features sets.

In some embodiments, the dynamic configuration to the image processing function comprises enabling the image processing function to (temporarily) disregard, for at least one following camera image frames, reference features sets belonging to other object(s) that were not successfully detected in the previous camera image frame. Accordingly, an output configuration for the image processing function may be a set of identifiers of reference features sets (of the detected object) to be considered in the next camera image frame. If it is unlikely that the user is going to be pointing at other objects of interest in the next camera image frame, the efficiency and/or accuracy of the image processing function may be increased by reducing the reference features sets in consideration. For instance, for a set of objects A, B, C, and D, if object A and object B were detected in the previous camera image frame, reference features sets of object C and object D may be disregarded in the image processing function in the next camera image frame. If at some point, neither object A or object B is detected anymore, then reference features sets of objects A, B, C, and D would be under consideration in the next camera image frame.

Efficiency may be improved by reducing the computational resources that would have otherwise been consumed if the reference features sets of the other object(s) are under consideration. Furthermore, by reducing the number of reference features sets under consideration, the accuracy of the image processing function (i.e., the ability to correctly detect the object in the camera image frame) may be increased by reducing the number of false positives that would have otherwise been produced in the object recognition and/or tracking processes performed on the reference features sets of the other objects(s) that were not successfully detected in the previous camera image frame.

The dynamic configuration of the image processing function may occur in different ways. In one embodiment, the image processing function may begin by considering all reference features sets for all original reference images and their respective slices. If at least one object has been detected, then the image processing function may reduce the reference features sets in consideration to the reference features set(s) of the original reference image and the respective slices of the detected object(s). In another embodiment, the image processing function may begin by considering reference features sets for all original reference images (and not for the respective slices). If at least one object has been detected, then the image processing function may consider, for the next camera image frame, the reference features sets of the original reference image of the detected object(s) and the respective slices associated with the original reference image. This embodiment may be advantageous if the user device is likely to capture a camera image frame showing the entire object of interest before moving closer or "zooming in" to the object of interest. For instance, the user may be browsing a magazine, and is expected to capture a camera image frame of the entire page of the magazine before moving the camera of the user device closer towards a portion of the page.

The configuration of the image processing function may vary depending on the particular application. In some embodiments, the determined configuration may specify a set of reference features sets to consider in the next frame, and parameter(s) for configuring the image processing function and its sub-functions (e.g., parameters prescribed for each, some, or all of those reference features sets). The parameters allows the image processing function to optimize for, e.g., fast object recognition and/or accurate pose estimation.

Generally, the method begins by executing the image processing function on a camera image frame (step 502). In some embodiments, the image processing function considers all objects to potentially be recognizable and/or trackable in the current camera frame. The image processing function may compare the extracted features set of the camera image frame against each of the reference features sets for all the objects. The reference features sets for all the objects may include the reference features sets for at least the original reference image and the respective slice(s) of the original reference image.

After object recognition and/or tracking has been performed for substantially all objects of interest, it is determined whether at least one object has been detected (step 504). For instance, the identifier(s) of the detected object(s) is determined. In another instance, the identifier(s) of the reference features set(s) that produced the detection result is determined. In some embodiments, it is determined whether object recognition and/or tracking has been successfully performed on at least one reference features sets (either for an original image or a slice). For instance, it is determined whether pose information has been successfully estimated for any of the reference features sets. In another instance, it is determined whether at least one object has been successfully recognized from any of the reference features sets.

If no objects has been detected, then the method returns to step 502. If at least one object has been detected, then the image processing function is then executed for the next camera image frame on the basis of metadata associated with the reference features set that produced the detection result (step 506).

In one embodiment, the metadata for a detected object may include parent-child relationship information indicating which of the reference features sets belong to the detected object. Advantageously, the image processing function may disregard reference features sets belonging to other object(s) which was not detected in the previous camera image frame, such that higher efficiency and/or accuracy of image processing function may be achieved.

In another embodiment, the metadata for reference features set that produced the detection result may indicate sibling information, which provides information on which reference features sets are generated from neighboring or nearby slices. Advantageously, the image processing function may be configured on the basis of the sibling information such that reference features sets generated from sibling slices are processed with a faster object recognition and/or more accurate pose estimation than reference features sets generated from non-sibling slices or reference images. As a result, the accuracy of object recognition and/or tracking may be increased for the next image frame.

After object recognition and/or tracking has been performed on the basis of the reference features sets for the detected object(s) from the last camera image frame, it is determined whether at least one object has been detected in the current camera image frame. In some embodiments, it is determined whether object recognition and/or tracking has been successfully performed on at least one reference features sets (either for an original image or a slice associated with a detected object). If at least one of the reference features sets produced successful results for object recognition and/or tracking, then the method continues to execute the image processing function on the basis of the metadata (step 506). If none of the reference features sets produced successful results for object recognition and/or tracking, then the image processing function returns to step 502.

If in the previous camera image frame, more than one object has been detected, and in the current image frame, only a subset of the plurality of detected objects has been detected, then the image processing function may be further configured, e.g., reduce the number of reference features sets under consideration. The image processing function may disregard further reference features sets associated with the objects detected in the previous camera image frame but not in the current camera image frame.

Figure 6:
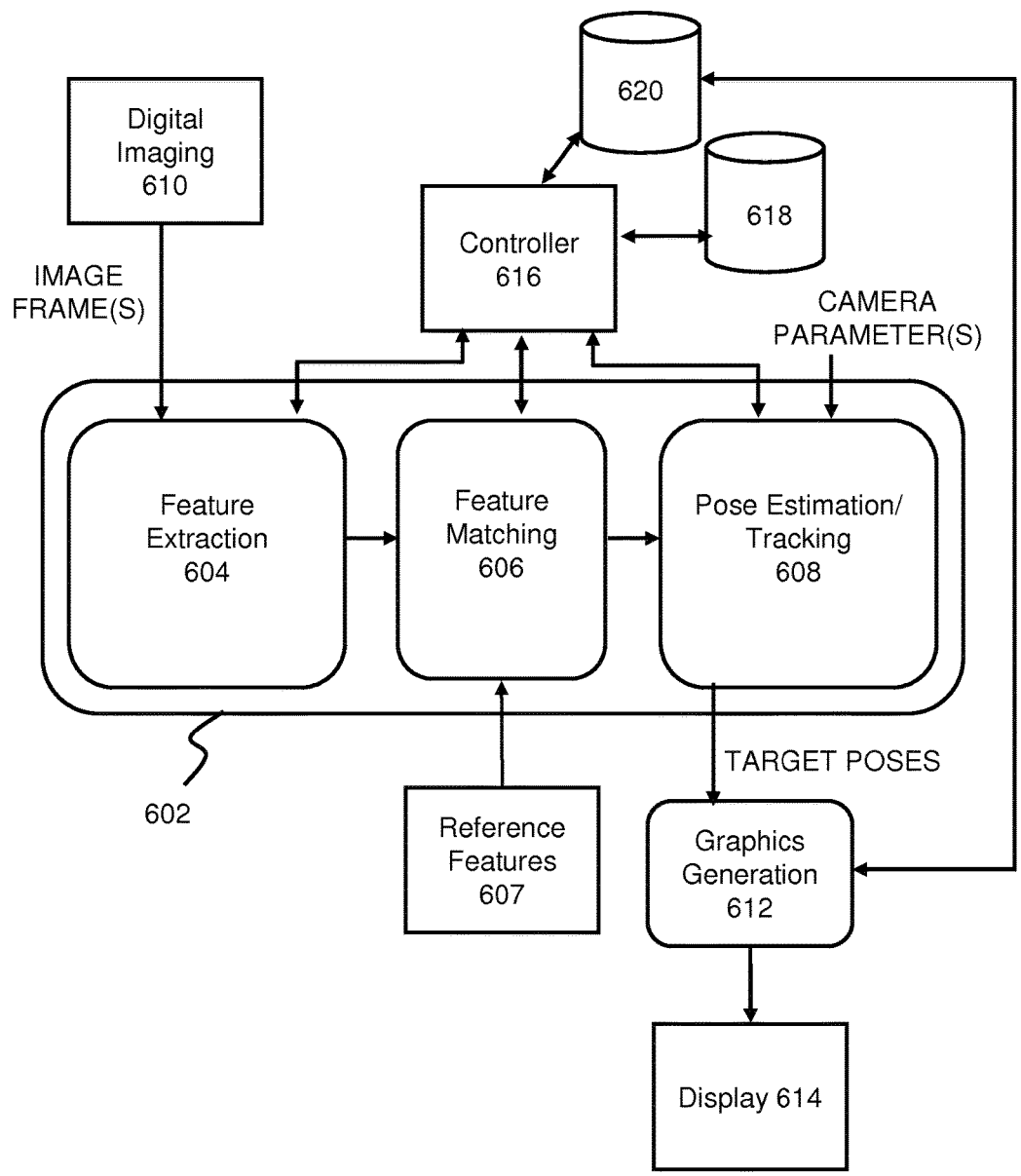
FIG. 6 depicts at least part of an exemplary AR system comprising a dynamically configurable image processing function according to one embodiment of the disclosure.
Figure 7:
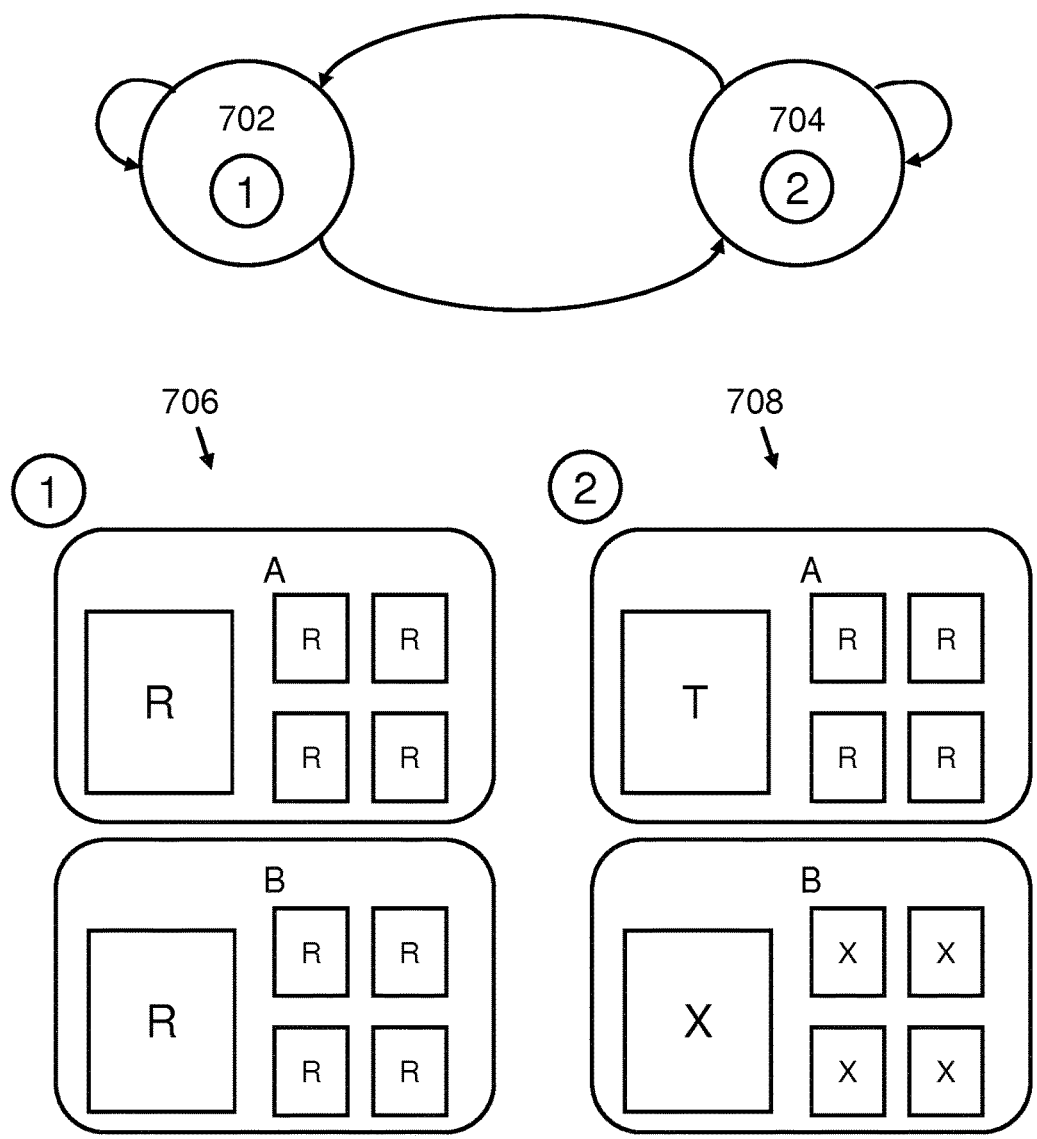
FIG. 7 depicts exemplary global detection states according to an embodiment of the disclosure.

In some embodiments, the dynamic configuration of the image processing function may be modeled as a state machine having a plurality of detection states, details of which are explained in relation to FIGS. 6-7. Accordingly, state information may be provided as input to a controller such that the controller may output a configuration for the image processing function. The state information in various detection states may represent whether at least one object has been detected in the previous camera image frame and/or the identity of the detected object and/or the reference features set that produced the detection result. Furthermore, metadata associated with the objects, slices and/or the reference features sets may be configured to enable the image processing function to operate differently depending on the current detection state.

FIG. 6 depicts at least part of an exemplary AR system comprising a dynamically configurable image processing function according to one embodiment of the disclosure. In particular, FIG. 6 schematically depicts an image processing function 602 connected to a controller 616. The image processing function may comprise a feature extraction function 604, a feature matching function 606 and a pose estimation/tracking function 608.

The feature extraction function may receive one or more image frames from the digital imaging part 610 (e.g., a camera). The feature extraction function may then extract suitable features (i.e. specific structures in an image such as edges or corners) from the image and store these extracted features (an extracted feature set) in a memory. Features may be stored in the form of a specific data structure usually referred to as a feature descriptor. Various known feature descriptor formats, including SIFT (Scale-invariant feature transform), SURF (Speeded Up Robust Features), HIP (Histogrammed Intensity Patches), BRIEF (Binary Robust Independent Elementary Features), ORB (Oriented-BRIEF), Shape Context, etc., may be used.

A feature descriptor may include at least a location in the image from which the feature is extracted, descriptor data, and optionally, a quality score. On the basis of the quality score, features may be stored in an ordered list. For example, if extraction is performed on the basis of corner information ("cornerness") of structure in an image frame, the list may be sorted in accordance to a measure based on this corner information.

Then, after extracting features from the image frame, a feature matching function 606 may be executed. The feature matching function may receive reference features sets 607 associated with one or more objects that may be of interest. These reference features sets may be requested from a remote feature database. Alternatively, at least some of the reference features sets may be pre-loaded or pre-provisioned in a memory of the AR device. Thereafter, the extracted features set may be matched with the reference features set(s) associated each object. The implementation of the matching process may depend on the type of feature descriptor used. For example, matching may be computed on the basis of the Euclidean distance between two vectors, the Hamming distance between two bitmasks, etc.

As a result of the matching process, pairs of matched extracted/reference features, i.e. corresponding feature pairs, may be generated wherein an error score may be assigned to each pair. A threshold parameter associated with the error score may be used in order to determine which matched pairs are considered to be successful corresponding feature pairs. The result of this process is a list of corresponding feature pairs, i.e. a list of pairs of extracted and reference features having an error score below the threshold parameter.

The availability of reference features set(s) generated on the basis of slices of the original reference image is particularly important in the feature matching function, because reference features sets for an original reference image would not make a great match to the extracted features set if the image frame only shows a part of the object. Not enough features of the reference features set would be present or visible in the image frame for successful feature matching to occur (i.e., obtaining results having lower error scores).

On the basis of the list of corresponding feature pairs, a pose estimation function 608 may calculate the pose information associated with the object. For instance, the pose estimation function may determine an estimate of the pose parameter of the object with reference to the AR device which can be determined on the basis of the intrinsic camera parameters, including the focal length and the resolution of the image sensor. The intrinsic parameters relate to the parameters used in the well-known 3×4 homogeneous camera projection matrix. Pose estimation may be done by a fitting processes wherein a model of the target object is fitted to the observed (extracted) features using e.g. function optimization. As the list of corresponding feature pairs may likely contain pairs, which negatively influence the estimation process (so-called "outliers"), the model fitting may comprise a process wherein outliers are identified and excluded from the set of corresponding features pairs. The resulting feature set (the so-called "inlier" set) may then be used in order to perform the fitting process.

In the context of this disclosure, when the pose information is successfully estimated, the image processing function has detected a particular object on the basis of a particular reference features set. In the context of this disclosure, pose information may be considered successfully estimated when the reference features set has one of the highest number of corresponding feature pairs in the feature matching function, and when pose parameters could be estimated in the pose estimation function. One skilled in the art would appreciate that other suitable criteria may be used to determine whether an object has been detected by the image processing function.

The pose information generated by the pose estimation function may then be used by the graphics generation function 612 which uses the pose information to transform (i.e. scaling, reshaping and/or rotating) a predetermined content item so that it may be displayed on display 614 together with the detected object in the image frame.

Hierarchical relationship and/or spatial relationship information relating the slices to other slices and/or the original reference image may be stored as metadata in a memory 620. Furthermore, relative positioning and/or sizing of the slices in relation to the original reference image may also be stored as metadata in memory 620. As such, the graphics generation function may utilize the relative positioning or sizing metadata to generate augmentations without substantial visible changes in the placement of the augmentation when the page detection states switches from one slice to another within a particular page.

The above described process executed by the feature extraction, feature matching and pose estimation function is repeated for substantially each image frame. Depending on whether the system meets certain state transition criteria (e.g., whether an object has been detected), the image processing function may stay or transition between different detection states. For instance, when at least one reference features set has produced a detection result (i.e., an object has been detected from the at least one reference features sets), then the image processing function may transition from a first detection state to a second detection state.

Once an object has been detected, the image processing function may leverage the metadata (e.g., the relationship information) to, e.g., adjust parameters to the functions for a subset of the plurality of reference features sets. A controller 616 is provided to manage the image processing function by configuring the functions with different sets of function parameter values. Depending on the result of object recognition and/or tracking, the controller may update the state information as stored in a memory 618 on the basis of the metadata. Depending on the current state and the metadata, different parameter values may be used to dynamically configure the image processing function. Said parameter values may be stored as state information in the memory 618. Each set of function parameter values may be associated with a different state of the image processing function, wherein different states may be optimized for a specific image processing purpose such as fast recognition of an object out of a large set of pre-loaded reference features sets or accurately estimating pose information (a smaller set of reference features sets associated with) previously recognized objects. The function parameter values may be associated with individual reference features sets. The output of said parameter values may be provided by a mapping function in the controller.

The controller may monitor the process executed by the image processing function and check whether certain state transition conditions are met. For example, upon initialization, the controller may set the image processing function in the first global detection state (scanning state) to allow objects to be quickly recognized in an image frame. If no objects are detected, the controller may determine the image processing function to stay in the first global detection state for processing subsequent image frames until at least one object is detected. If at least one object is detected, the controller may determine that a state transition condition is met and initiate a state transition to the second global detection state (page state) by provisioning the image processing function with another set of function parameter values. Furthermore, to process the reference features sets associated with a particular object differently, the controller may update the state information for the reference features sets on the basis of the metadata associated with the object and/or reference features sets. Switching to the second global detection state may include at least one adjustment in a function parameter value used by the image processing function.

In some embodiments, depending on the detection state, some reference features sets may be differently optimized for quick object recognition or accurate tracking (pose estimation). For instance, a mapping function in the controller may take the metadata associated with the detected object and/or the reference features set that produced the detection result, and output function parameter values that controls how a particular reference features set should be processed by the image processing function.

If a particular reference features set has been optimized for quick object recognition, then the controller may configure the image processing function on the basis of function parameter values such that a relatively small number of extracted features (between approximately 50 to 150 features) are used. Moreover, a maximum computation time for pose estimation may be set to a relatively small amount (between approximately 5 to 10 ms spent in the (robust) estimation process; or, alternatively, approximately 20-50 (robust) estimation iterations).

If a particular reference features set has been optimized for accurate tracking, then the controller may configure the imaging processing function on the basis of function parameter values such that pose estimation of a object that is present in the image frame may be performed with high precision. In other words, the image processing function may be optimized towards accuracy of pose estimation. In general, if optimized for tracking, the image processing function may be configured to use a relatively large number of extracted features (between approximately 150 and 500 features). Moreover, maximum allowed computation time for pose estimation is not set or limited to a relatively large amount of time (between approximately 20 to 30 ms spent in the (robust) estimation process; or, alternatively, approximately 50-500 (robust) estimation iterations).

Hence, from the above it follows that the controller allows an image processing function to adapt the function parameter values (for particular reference features sets) in accordance with a state machine wherein each state in the state machine may be optimized for a specific image processing purpose. In some embodiments, the state machine may be implemented by a mapping function. Accordingly, a dynamically configurable image processing function is provided.

Figure 8:
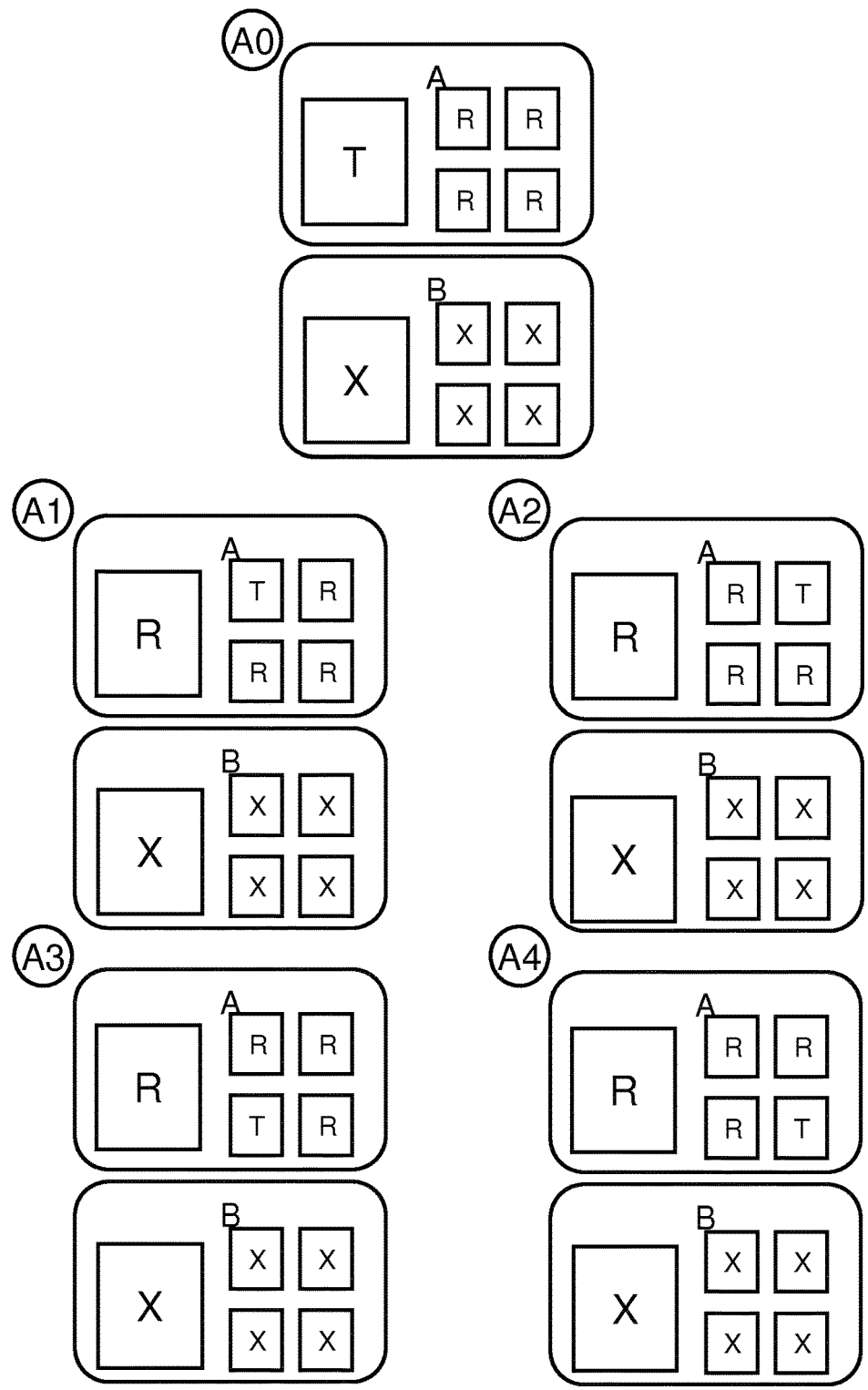
FIG. 8 depicts exemplary page detection states according to an embodiment of the disclosure.

FIGS. 7 and 8 serve to illustrate the dynamic configuration of the image processing function for an exemplary system where reference features sets for two pages or objects (referred to as page A and page B) are processed differently depending on which reference features set produced the detection result. For instance, the two pages may be two actual magazine pages. For each page, a reference features set is provided for the original reference image (shown as the larger rectangles), and four reference features sets are provided for four slices created from the reference image (shown as the four smaller rectangles). The specific example given in FIGS. 7-8 are appreciated as an illustrative example only, and is not meant to be limiting in any way. For instance, more reference features may be provided for each object or simply more reference features may be provided for other objects. In another instance, the original reference image for the object(s) may be sliced in a different manner. The differing configurations may be represented as a state machine description, and/or the differing configurations may be output configurations of a mapping function.

FIG. 7 depicts exemplary global detection states according to an embodiment of the disclosure. In particular, FIG. 7 depicts a state machine description of at least two detection states associated with the image processing function, comprising a first global detection state (the scanning state 702) and a second global detection state (the page state 704).

In the first global detection state, the image processing function is configured to consider page A and page B for object recognition and tracking. This detection state is considered a scanning state because it is most suitable for the situation where the (moving) AR device is scanning for any object that it may be able to recognize or track.

Seen in illustration 706 are reference features sets associated with page A and page B in scanning state. Each of the reference features sets (or, alternatively, a combined representation of these feature sets) are considered and processed by the image processing function. In some embodiments, the reference features sets are processed in such a way that optimizes for recognizing an object quickly from the reference features sets (denoted by the letter R). For instance, the image processing function may be configured such that recognition of an object that is present in an camera image frame is likely to be successful in the least amount of time.

If at least one of pages has been detected in the previous image frame, then the state changes to the second global detection state. In this example, the reference features set associated with the original reference image of page A has produced a successful object recognition and/or tracking result. Accordingly, page A has been detected, and the system switches to the page state.

In the second global state, the image processing function is configured to consider the detected object(s) for object recognition and tracking. In this embodiment, the image processing function considers the reference features sets of page A (denoted by the letters T and R) and disregards the reference features sets of page B (denoted by the letter X). Advantageously, the second global state allows the image processing function to focus its computations on the object that has previously been detected, namely page A.

In certain cases, the image processing function in the second global state does not disregard the reference features sets of page B entirely. For instance, only the reference features sets of the slices are disregarded. In another instance, the image processing function may continue to consider the reference features sets of page B, but deprioritizes page B by spending less computational resources devoted to recognizing and/or tracking an object from those reference features sets.

Seen in illustration 708 are reference features sets associated with page A and page B in page state. Only the reference features sets for page A are considered and processed by the image processing function. Because the original reference image of page A provided the successful detection result, the image processing function may be optimized such that more computational resources are spent on performing tracking (pose estimation, as denoted by the letter T) on the reference features set associated with the original reference image. In this manner, better pose information can be estimated from the reference features set associated with the original reference image. Accordingly, better user experience is achieved because augmentations generated based on more accurate pose information would appear better to the user.

In some embodiments, the other reference features sets associated with page A are processed in such a way that optimizes for recognizing an object quickly from the reference features sets (denoted by the letter R). For instance, the image processing function may be configured such that recognition of an object that is present in an camera image frame is likely to be successful in the least amount of time. Accordingly, better user experience is achieved because the image processing function is able to perform switch to using another reference features set of page A quickly and efficiently.

When in the second global detection state and no reference features sets has produced a detected object, then the image processing function is reconfigured to enter the first global detection state, such that the function is optimized to scanning again.

In certain embodiments, state changes between the two global states may not occur after every camera image frame. A threshold may be used to buffer how quickly the global states may change, such that the resulting output to the user is more stable. For instance, the state change may only occur if the substantially same object(s) has been detected for at least five camera image frames (or some other suitable threshold number).

By adding reference features sets generated based on slices of the original reference images, the burden on the image processing function to perform object recognition and tracking efficiently is increased. However, by having the global detection states, efficiency may be increased because the page state may allow the image processing function to reduce the number of reference features sets under consideration. Furthermore, accuracy may be increased because the number of detected false positives may be reduced.

FIG. 8 depicts exemplary page detection states according to an embodiment of the disclosure. Specifically, FIG. 8 depicts exemplary illustrations of page detection states based on the two page example discussed above in relation to the second global state (the page state). The different page detection states are dependent on which of the reference features sets had produced a successful object recognition and/or tracking result. For instance, a mapping function in a controller may output a configuration for specifying parameters for how each, some or all reference features set(s) is to be processed by the image processing function. It can be appreciated that there may be at least five different page detection (sub)states (e.g., five different possible configurations). There may be more than five page states if more than one reference features sets had produced a successful object recognition and/or tracking result. The page detection states may transition substantially freely from each other.

As seen in illustration A0, the image processing function has detected an object based on the reference features set of the original reference image for page A. Accordingly, the image processing function is configured to optimize for accurate tracking (pose estimation) for the reference features set of the original reference image (denoted by the letter T). In contrast, the image processing function is configured to optimize for fast object recognition for the reference features sets associated with the other four slices. The configuration may comprise a set of identifiers associated with a group of reference features set, and parameter(s) associated thereto for configuring the image processing function. Accordingly, certain reference features set(s) are processed differently by the image processing function than other reference features set(s). In illustrations A1-A4, the image processing function detected an object based on the reference features set of one of the slices created from the original reference image for page A. Accordingly, the image processing function is configured to optimize for accurate tracking (pose estimation) for the reference features set of the slice that produced the successful object recognition and/or tracking result (denoted by the letter T). In contrast, the image processing function is configured to optimize for fast object recognition for the reference features sets associated with the other three slices and the original reference image (denoted by the letter R).

Advantageously, the page detection states allows the image processing function to seamlessly transition between using different reference features sets of the same object. As a result, a smoother user experience and a less jittery graphical output through the display is achieved when the image processing function is able to provide better object recognition and/or tracking results from the various reference features sets, even when the user device is moving around pointing and/or "zooming in" at various parts of the object of interest.

It is appreciated that transitions between one camera image frame to another are not restricted to a certain number of finite states. The configuration for the reference features sets may be an output of a function in a controller, which is configured to output certain parameter(s) for at least one reference features set. Advantageously, more flexibility is provided for how the image processing function is dynamically configured.

Generally, the reference features sets generated from the slices may be tested to determine whether the reference features set is suitable or good enough for object recognition and/or tracking. This may be referred to as a learning process to learn whether the reference features sets are sufficiently good enough for object recognition and/or tracking. Accordingly, the resulting plurality of reference features sets are of higher quality, and the accuracy of object recognition and/or tracking is improved. The learning process may include projecting the image of the slice in different perspectives, and testing whether the reference features set is able to recognize and/or track the object. If the reference features set is able to recognize and/or track the object for a sufficient number of projected images of the slice, then the reference features set may be used. Conversely, if the reference features set is not able to recognize and/or track the object for a sufficient number of randomly distorted images of the slice, then the reference features set is discarded. This situation may arise if the slice itself simply does not contain sufficient features to allow for object recognition and/or tracking to successfully occur.

Figure 9A:
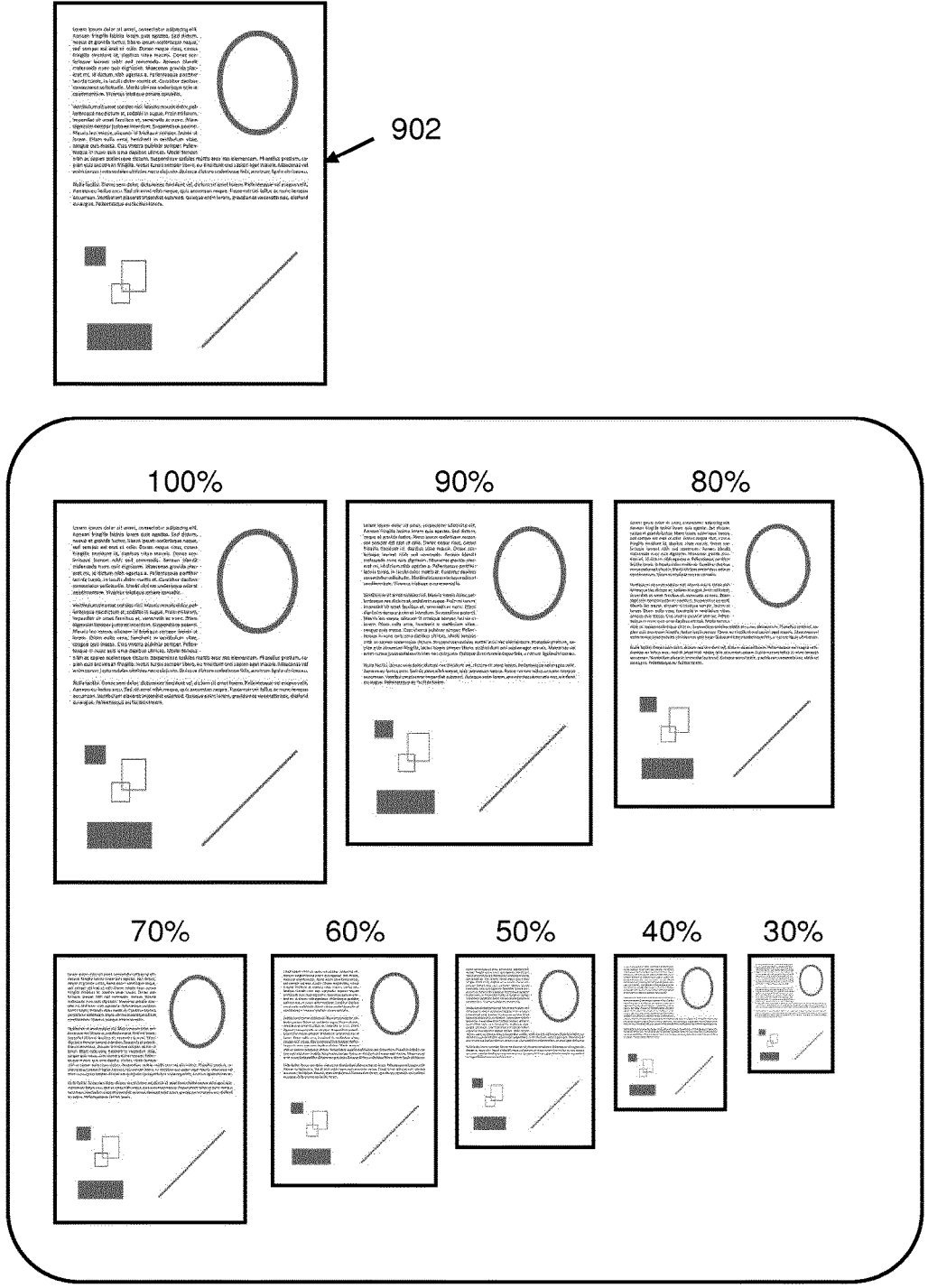
FIGS. 9A-B depicts illustrative learning methods for creating reference features sets, according to some embodiments of the disclosure.
Figure 9B:
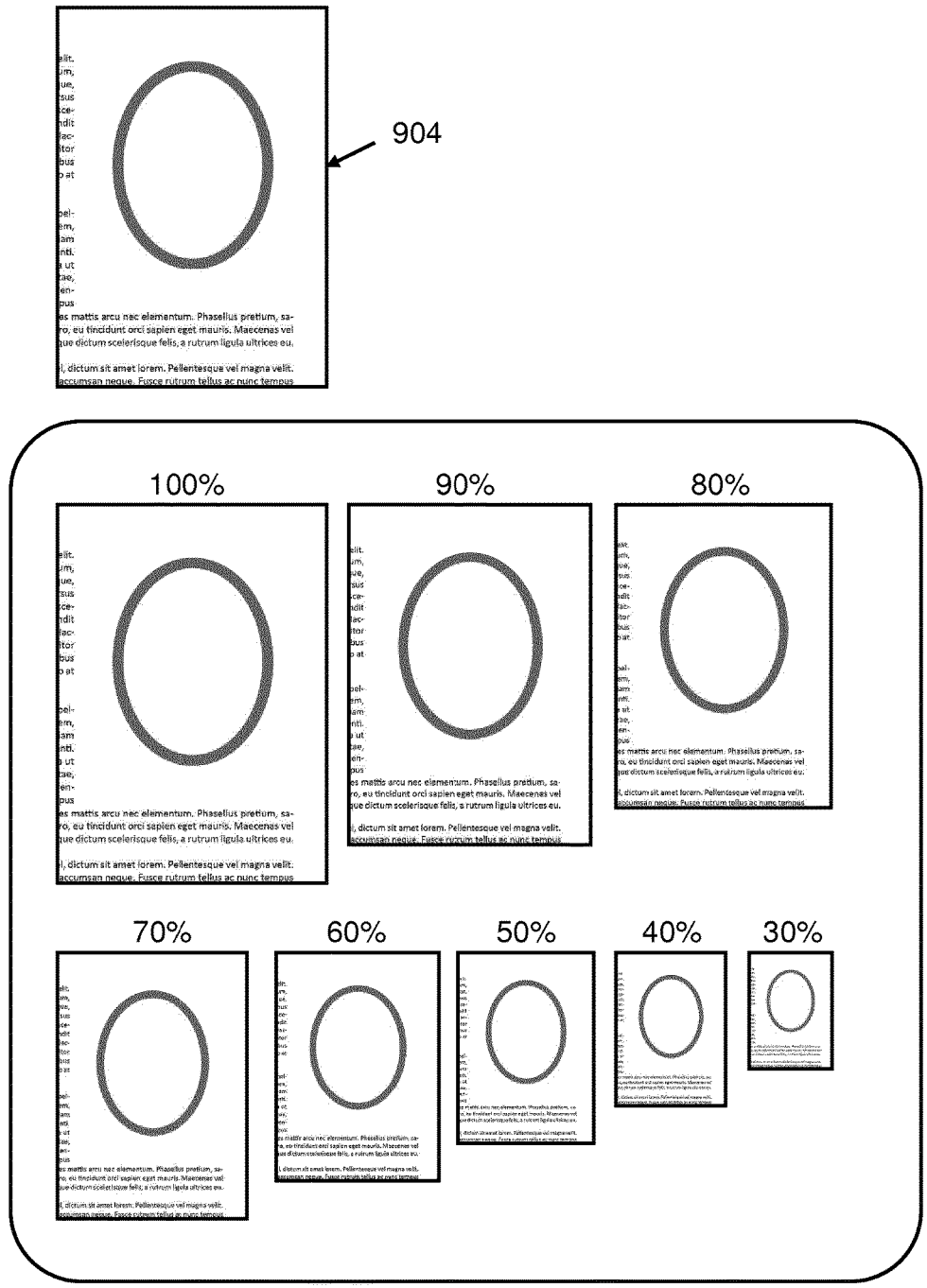

In some embodiments, a plurality of reference features sets may be created at different scales for a particular image (the image may be an original reference image or a slice). Each of the reference features sets at different scales may also be tested such that it is determined whether a particular reference features set is sufficiently good for object recognition and/or tracking. FIGS. 9A-B depicts illustrative learning methods for creating reference features sets, according to some embodiments of the disclosure. For the original reference image 902, a plurality of images at different scales of the original reference image may be used for generating a plurality of reference features sets. For the slice 904 (at the size one-fourth of the original reference image, a plurality of images at different scales may also be used for generating a plurality of reference features sets. Note that for the slice image at 50% scale, the information contained in the reference features set is included in the original reference image at 100%. Thus, it is possible to not generate reference features sets for slice images lower than the 50% scale, since the information in those images is already included in the multi-scale reference features set of the original reference images. Advantageously, the generation and learning of reference features sets is more efficient because less reference features sets are created. Furthermore, the image processing function may be more efficient because less reference features sets are processed by the image processing function.

Figure 10:
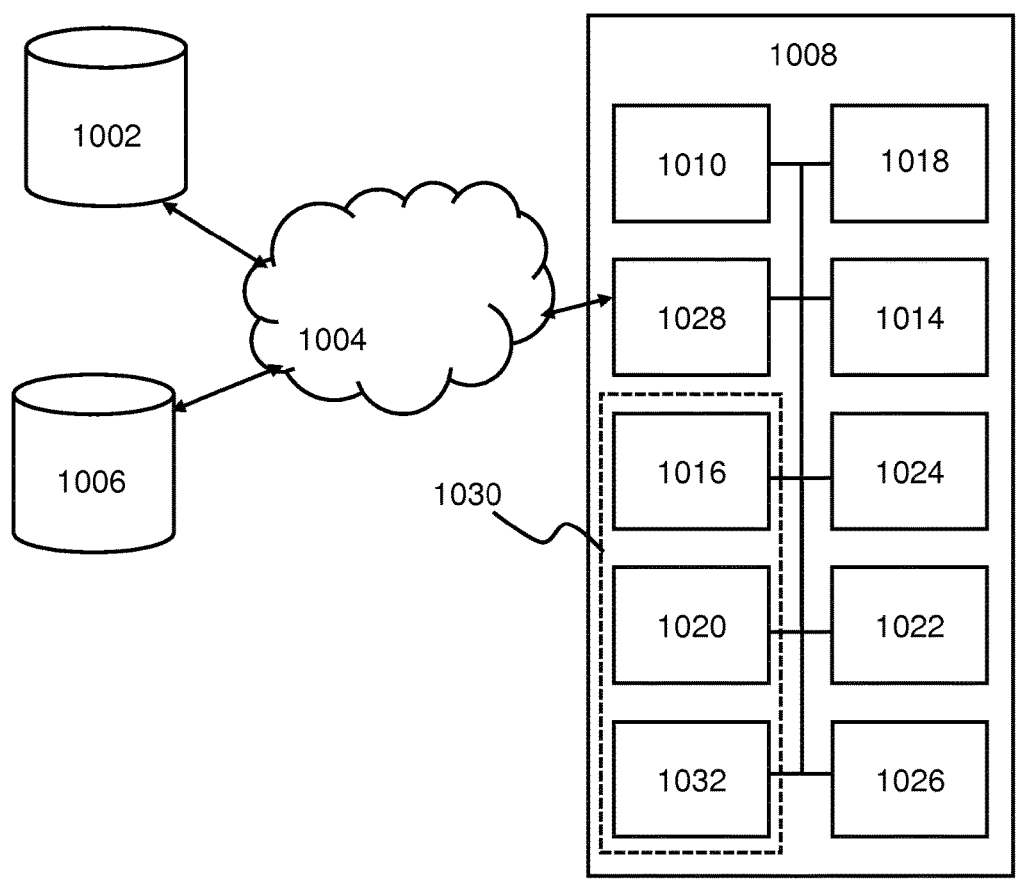
FIG. 10 depicts an illustrative augmented reality system, according to one embodiment of the disclosure.

FIG. 10 depicts an illustrative augmented reality system, according to one embodiment of the disclosure. In particular, the AR system may comprise one or more (mobile) augmented reality (AR) devices 1008 configured for executing an AR application 1030. An AR device may be communicably connected via a data transport network 1004, e.g. the Internet, to one or more servers 1002,1006 and/or databases which may be configured for storing and processing information which may be used by the image processing function in the AR application.

For example, AR system may comprise at least a feature database 1002 comprising reference features sets used by the AR application during the process of recognizing and determining pose information associated with one or more objects in camera image frames. Further, AR system may comprise a content database 1006 comprising content items, which may be retrieved by an AR application for augmenting an object recognized and/or tracked by the AR application. For instance, the AR application may query the content database with an identifier of the object to retrieve content associated with the object. The retrieved content may be used to generate augmentations. The AR device may comprise a plurality of components, modules and/or parts that may be communicably connected together by a communication bus. In some embodiments, those sub-parts of the AR device may be implemented in a distributed fashion (e.g., separated as different parts of an augmented reality system).

AR device may comprise a processor 1010 for performing computations for carrying the functions of device, for instance the image processing function for performing object recognition and/or tracking. In some embodiments, the processor includes a graphics processing unit specialized for rendering and generating computer-generated graphics, e.g., to generate augmentations based on the pose information and/or metadata associated with the reference features set from which the pose information is determined. Preferably, processor is configured to communicate, via a communication bus with other components of device.

The AR device may comprise a digital imaging part 1014, e.g. an image sensor such as an active pixel sensor or a CCD, for capturing images of the real world. The image sensor may generate a stream of (camera) image frames, which may be stored in an image frame buffer in memory 1024 (accessible by the AR application). Exposure parameters associated with image sensor (e.g., shutter speed, aperture, ISO) may be adjusted manually or on the basis of an exposure function.

Image frames rendered by the image sensor and buffered in the memory may be displayed by a display 1022 which may be implemented as a light emitting display or any other any suitable output device for presentation information in visual form. In one embodiment, the display may include a projection-based display system, e.g. projection glasses or a projection system for projection of visual information onto real world objects. In some other embodiments, a display may include a head-mounted display system configured for optically information into the eyes of a user through a virtual retinal display.

The device may utilize a user interface (UI) 1018 which may comprise an input part and an output part for allowing a user to interact with the device. The user interface may be configured as a graphical user interface (GUI) on the basis of e.g. a touch-sensitive display. In that case, the UI may be part of the display. Other user interfaces may include a keypad, touch screen, microphone, mouse, keyboard, tactile glove, motion sensor or motion sensitive camera, light-sensitive device, camera, depth or range cameras, or any suitable user input devices. Output part 1018 may include visual output, as well as provide other output such as audio output, haptic output (e.g., vibration, heat), or any other suitable sensory output.

The AR device may further comprise an Operating System (OS) 1026 for managing the resources of the device as well as the data and information transmission between the various components of the device. Application Programming Interfaces (APIs) associated with the OS may allow application programs to access services offered by the OS. For example, one API may be configured for setting up wired or wireless connections to data transport network. Mobile service applications in communication module 1028 may be executed enabling the AR application to access servers and/or databases in connected to the data network.

The AR application 1030 may be at least partially implemented as a software program. Alternatively and/or additionally AR application 1030 may be at least partially implemented in dedicated and specialized hardware processor. The implementation of AR application 1030 may be a computer program product, stored in non-transitory storage medium, when executed on processor 1010, is configured to provide an augmented reality experience to the user. The AR application may further comprise an image processing function 1016 and a graphics generating function 1020 for providing computer-generated graphics. Furthermore, the AR application may comprise a controller 1032 for monitoring the outcome of the image processing function for certain state transition conditions as well as maintaining the global detection state and/or page detection state. Alternatively or additionally, the controller may be configured with a (mapping) function for outputting a configuration for the image processing function on the basis of certain inputs, such as the state information. The state information may be stored in the memory 1024.

Although the present disclosure discusses primarily having a flat object such as a page in a magazine, a poster, a billboard, etc. as the target object, it is appreciated by one skilled in the art that the target object may be a three-dimensional object. In which case, the two-dimensional image of the three-dimensional object may present one side of the three-dimensional object, e.g., a side wall of a building.

Reference features or extracted features are used in this disclosure to describe broadly a plurality of features that may be extracted from a reference image and a camera image frame, respectively. Features in a reference features set or an extracted features set may be stored in the form of a specific data structure usually referred to as a feature descriptor. Various known feature descriptor formats, including SIFT (Scale-invariant feature transform), SURF (Speeded Up Robust Features), HIP (Histogrammed Intensity Patches), BRIEF (Binary Robust Independent Elementary Features), ORB (Oriented-BRIEF), Shape Context, etc., may be used. A feature descriptor may include at least a location in the image from which the feature is extracted, descriptor data, and optionally, a quality score. On the basis of the quality score, features may be stored in an ordered list. For example, if extraction is performed on the basis of corner information ("cornerness") of structure in an image frame, the list may be sorted in accordance to a measure based on this corner information.

With some modifications, one skilled in the art may extend the embodiments described herein to other architectures, networks, or technologies.

One embodiment of the disclosure may be implemented as a program product for use with a computer system. The program(s) of the program product define functions of the embodiments (including the methods described herein) and can be contained on a variety of computer-readable storage media. The computer-readable storage media (or referred to as "storage" herein) may be a non-transitory storage medium. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the disclosure is not limited to the embodiments described above, which may be varied within the scope of the accompanying claims.

The invention claimed is:

1. A method of generating reference features sets on a basis of a reference image of an object, said reference features sets for use in an image processing function configured to recognize the object and/or estimate pose information of the object from an image frame obtained from a digital imaging device by matching extracted features of the image frame with the reference features sets, the method comprising:
    extracting a first reference features set from the reference image;
    obtaining a first slice of the reference image, wherein the first slice is a first portion of the reference image;
    extracting a second reference features set on the basis of the first slice;
    obtaining a second slice of the reference image, wherein the second slice is a second portion of the reference image and wherein the first and second portions partially overlap;
    extracting a third reference features set on the basis of the second slice;
    generating metadata for the reference image, the first slice and the second slice, said metadata comprising information indicating a hierarchical relationship between the reference image, the first slice and the second slice, wherein the metadata comprises at least one of: hierarchical relationship information, parent-child relationship information, sibling relationship information, relative distance information, relative positioning information, and sizing information; and
    identifying, from the extracted reference features sets, the reference features sets belonging to the object, based on the generated metadata for the reference image, the first slice and second slice.

2. The method according to claim 1, wherein obtaining the first slice of the reference image comprises:
    obtaining a portion of the reference image as the first slice in accordance with a pre-defined slicing template, wherein said slicing template defines at least one area within a border of the reference image, and/or
    receiving user-defined input defining at least a location and/or an area within the border of the reference image for obtaining the first slice.

3. The method according to claim 1, wherein obtaining the first slice of the reference image comprises:
    determining an area of saliency of the reference image.

4. The method according to claim 3, wherein determining an area of saliency of the reference image comprises:
    determining an area of the reference image where features extractable from the reference image are concentrated; and obtaining the first portion of the reference image on the basis of the area of saliency.

5. The method according to claim 1, further comprising obtaining a third slice of the first slice, wherein the third slice is a first portion of the first slice; and
    extracting a fourth reference features set on the basis of the second slice.

6. The method according to claim 1, further comprising obtaining a fourth slice of the reference image, wherein the fourth slice is a third portion of the reference image, and the first portion of the reference image overlaps with the third portion of the reference image.

7. A computer program product, implemented on computer-readable non-transitory storage medium, the computer program product configured for, when run on a computer, executing the method according to claim 1.

8. A method of dynamically configuring an image processing function executable iteratively on a series of image frames, said image processing function comprising (1) extracting features from an image frame, (2) matching extracted features with a plurality of reference features sets associated with at least one object, wherein each reference features set associated with at least one object is extracted from at least one of the series of image frames, and (3) estimating pose information on a basis of features from extracted features that matches the features in a matching reference features set, wherein said method comprising:
    detecting an object in a previous image frame on the basis of the matching reference features set;
    obtaining metadata associated with the matching reference features set, wherein said metadata comprises information indicating a relationship of the matching reference features set with other reference features set(s) in the plurality of reference features sets, and optionally said metadata comprises at least one of: hierarchical relationship information, parent-child relationship information, sibling relationship information, relative distance information, relative positioning information, and sizing information; and
    configuring said image processing function on the basis of the metadata, such that the image processing function is executed differently for a following image frame, comprising:
        providing the metadata and/or an identifier associated with the matching reference features set as input to a mapping function;

receiving a configuration for the image processing function as an output from the mapping function; and configuring said image processing function using said configuration, wherein the mapping function comprises a state machine.

9. The method according to claim 8, wherein configuring said image processing function on the basis of the metadata comprises:

determining, from the metadata, which of the other reference features set(s) is related to the matching reference features set, and/or determining, from the metadata, which of the other reference features set(s) is not related to the matching reference features set; and configuring said image processing function, using identity information, to more quickly recognize an object and/or more accurately determine pose information from the reference features set(s) that is related to the matching reference features set, and/or configuring said image processing function, using said identity information, to disregard reference features sets that is not related to the matching reference features set.

10. The method according to claim 8, wherein the configuration for the image processing function as an output from the mapping function comprises:

at least one of: at least one parameter for configuring the image processing function, and at least one identifier for at least one reference features set, wherein said at least one identifier is associate with the at least one parameter for configuring the image processing function.

11. A dynamically configurable image processing module comprising one or more processors configured to:
  execute an image processing function executable iteratively on a series of image frames, said image processing function comprising (1) extracting features from an image frame, (2) matching extracted features with a plurality of reference features sets associated with at least one object, wherein each reference features set associated with at least one object is extracted from one of the series of image frames, and (3) estimating pose information on a basis of features from extracted features that matches the features in a matching reference features set; and
  detect an object in a previous image frame on the basis of the matching reference features set; and
a controller configured to:
  obtain metadata associated with the matching reference features set, wherein said metadata comprises information indicating a relationship of the matching reference features set with other reference features set(s) in the plurality of reference features sets; and
  configure said image processing function on the basis of the metadata, such that the image processing function is executed differently for a following image frame, comprising:
    provide the metadata and/or an identifier associated with the matching reference features set as input to a mapping function;
    receive a configuration for the image processing function as an output from the mapping function; and
    configure said image processing function using said configuration, wherein the mapping function comprises a state machine.

12. An augmented reality device comprising:
an image sensor for generating image frames;
a dynamically configurable image processing module according to claim 11 for detecting one or more target objects in an image frame and for generating pose information associated with at least one detected object; and
a graphics generator, including a graphics processing unit for rendering and generating computer-generated graphics, for generating a graphical item associated with said detected object on the basis of said pose information.

13. An augmented reality system comprising:
a features storage comprising a plurality of reference features sets associated with one or more objects;
a content storage comprising one or more content items associated with the one or more objects; and
at least one augmented reality device according to claim 12, said augmented reality device communicably connected to the features storage and the content storage.

14. An image processing module comprising one or more processors configured to:
  extract a first reference features set from a reference image of an object;
  obtain a first slice of the reference image, wherein the first slice is a first portion of the reference image;
  extract a second reference features set on a basis of the first slice;
  obtain a second slice of the reference image, wherein the second slice is a second portion of the reference image and wherein the first and second portions partially overlap;
  extract a third reference features set on a basis of the second slice;
  generate metadata for the reference image, the first slice and the second slice, said metadata comprising information indicating a hierarchical relationship between the reference image, the first slice and the second slice, wherein the metadata comprises at least one of: hierarchical relationship information, parent-child relationship information, sibling relationship information, relative distance information, relative positioning information, and sizing information; and
  identify, from the extracted reference features sets, the reference features sets belonging to the object, based on the generated metadata for the reference image, the first slice and second slice.

15. The image processing module according to claim 14, wherein said one or more processors are configured to obtain a portion of the reference image as the first slice in accordance with a pre-defined slicing template, wherein said slicing template defines at least one area within a border of the reference image.

16. The image processing module according to claim 14, wherein said one or more processors are configured to receive user-defined input defining at least a location and/or an area within a border of the reference image for obtaining the first slice.

17. The image processing module according to claim 14, wherein said one or more processors are configured to obtain the first slice of the reference image by determining an area of saliency of the reference image.

18. The image processing module according to claim 14, wherein said one or more processors are further configured to:
  obtain a third slice of the first slice, wherein the third slice is a first portion of the first slice; and
  extract a fourth reference features set on a basis of the second slice.

19. The image processing module according to claim 14, wherein said one or more processors are further configured to obtain a fourth slice of the reference image, wherein the fourth slice is a third portion of the reference image, and the first portion of the reference image overlaps with the third portion of the reference image.

20. The image processing module according to claim 14 wherein the metadata comprises at least one of: hierarchical relationship information, parent-child relationship information, and sibling relationship information.

21. The image processing module according to claim 14 wherein the metadata comprises at least one of: relative distance information, relative positioning information, and sizing information.

* * * * *